US012057070B2

(12) United States Patent
Zhang et al.

(10) Patent No.: US 12,057,070 B2
(45) Date of Patent: Aug. 6, 2024

(54) PIXEL CIRCUIT AND DRIVING METHOD THEREOF, AND DISPLAY PANEL

(71) Applicants: Wuhan Tianma Microelectronics Co., Ltd., Wuhan (CN); Wuhan Tianma Microelectronics Co., Ltd. Shanghai Branch, Shanghai (CN)

(72) Inventors: Mengmeng Zhang, Wuhan (CN); Yue Li, Wuhan (CN)

(73) Assignees: WUHAN TIANMA MICROELECTRONICS CO., LTD., Wuhan (CN); WUHAN TIANMA MICROELECTRONICS CO., LTD. SHANGHAI BRANCH, Shanghai (CN)

( * ) Notice: Subject to any disclaimer, the term of this patent is extended or adjusted under 35 U.S.C. 154(b) by 151 days.

(21) Appl. No.: 17/943,227

(22) Filed: Sep. 13, 2022

(65) Prior Publication Data

US 2024/0005858 A1 Jan. 4, 2024

(30) Foreign Application Priority Data

Jun. 29, 2022 (CN) ......................... 202210753229.7

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0426* (2013.01); *G09G 2300/0819* (2013.01); *G09G 2300/0852* (2013.01); *G09G 2300/0861* (2013.01); *G09G 2310/0286* (2013.01); *G09G 2310/08* (2013.01); *G09G 2320/0233* (2013.01)

(58) Field of Classification Search
CPC .................................................... G09G 3/3233
See application file for complete search history.

(56) References Cited

U.S. PATENT DOCUMENTS

2023/0343294 A1* 10/2023 Guo ..................... G09G 3/3266

FOREIGN PATENT DOCUMENTS

| | | | |
|---|---|---|---|
| CN | 106886111 | A | 6/2017 |
| CN | 112634832 | A | 4/2021 |
| CN | 113707077 | A | 11/2021 |

* cited by examiner

*Primary Examiner* — Gustavo Polo
(74) *Attorney, Agent, or Firm* — East IP P.C.

(57) ABSTRACT

The present application provide a pixel circuit and a driving method thereof, and a display panel. The pixel circuit includes: a driving module, a control end of the driving module being electrically connected to a first node; a threshold compensation module, electrically connected to a first scan signal line, the first node, and a first end of the driving module; a first switch module, electrically connected to a first light emitting control signal line and the first end of the driving module; a second switch module, electrically connected to a second light emitting control signal line, a second end of the first switch module, and a first electrode of a light emitting element; and a voltage regulator module, electrically connected to a constant voltage signal line and a target node.

20 Claims, 16 Drawing Sheets

20

PIXEL CIRCUIT AND DRIVING METHOD THEREOF, AND DISPLAY PANEL

CROSS REFERENCE TO RELATED APPLICATION

This application claims priority to Chinese Patent Application No. 202210753229.7, filed on Jun. 29, 2022, which is hereby incorporated by reference in its entirety.

TECHNICAL FIELD

The present application belongs to the field of display technology, and in particular, relates to a pixel circuit and a driving method thereof, and a display panel.

BACKGROUND

An organic light emitting diode (Organic Light Emitting Diode, OLED) display panel may include a plurality of sub-pixels arranged in an array, and each of the sub-pixels may include a pixel circuit and a light emitting element. A plurality of transistors are arranged in the pixel circuit. Based on mutual cooperation of the plurality of transistors, the pixel circuit transmits a driving current to the light emitting element to drive the light emitting element to emit light.

However, inventors of the present application found that some nodes in the pixel circuit have serious leakage, which caused the driving current transmitted by the pixel circuit to deviate from its standard value, thereby causing a deviation in a light emitting luminance of the light emitting element. In addition, when leakage time of the pixel circuits in different rows of the sub-pixels are different, the luminance of the light emitting elements in different rows of the sub-pixels are caused to be different, that is, a problem of uneven luminance is caused.

SUMMARY

Embodiments of the present application provide a pixel circuit and a driving method thereof, and a display panel.

In a first aspect, embodiments of the present application provide a pixel circuit, including: a driving module, a control end of the driving module being electrically connected to a first node; a threshold compensation module, a control end of the threshold compensation module being electrically connected to a first scan signal line, a first end of the threshold compensation module being electrically connected to the first node, a second end of the threshold compensation module being electrically connected to a first end of the driving module; a first switch module, a control end of the first switch module being electrically connected to a first light emitting control signal line, a first end of the first switch module being electrically connected to the first end of the driving module; a second switch module, a control end of the second switch module being electrically connected to a second light emitting control signal line, a first end of the second switch module being electrically connected to a second end of the first switch module, a second end of the second switch module being electrically connected to a first electrode of the light emitting element; and a voltage regulator module, a first end of the voltage regulator module being electrically connected to a constant voltage signal line, a second end of the voltage regulator module being electrically connected to the target node. The target node is a connection node between the first end of the second switch module and the second end of the first switch module. The voltage regulator module is configured to maintain a potential of the target node. In a light emitting stage, the first switch module is turned on in response to a turn-on level of the first light emitting control signal line, the second switch module is turned on in response to a turn-on level of the second light emitting control signal line, and the light emitting element emits light.

In a second aspect, embodiments of the present application provide a driving method for a pixel circuit. The pixel circuit includes the pixel circuit according to the first aspect. The driving method includes: in a light emitting stage, providing a turn-on level to a first light emitting control signal line, providing a turn-on level to a second light emitting control signal line, such that a voltage signal of the first end of the driving module is transmitted to the target node through the turned-on first switch module.

In a third aspect, embodiments of the present application provides a display panel, including the pixel circuit according to the first aspect.

BRIEF DESCRIPTION OF THE DRAWINGS

In order to more clearly illustrate technical solutions of embodiments of the present application, the drawings to be used in the embodiments of the present application will be briefly described. For those skilled in the art, other drawings can also be obtained from these drawings without any inventive effort.

DETAILED DESCRIPTION

Figure 1:
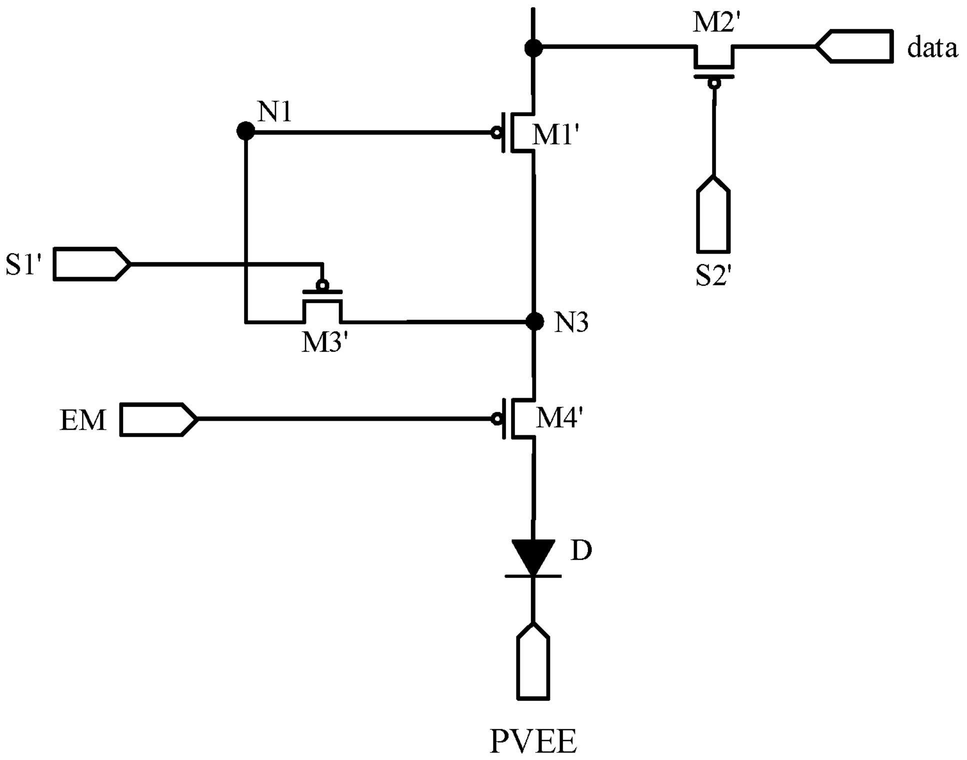
FIG. 1 is a schematic circuit diagram of a pixel circuit.

Features and exemplary embodiments of various aspects of the present application will be described in detail below. In order to make the objects, technical solutions and advantages of the present application clearer, the present application is further described in detail below with reference to the drawings and specific embodiments. It should be understood, that the specific embodiments described herein are only intended to explain the present application, but not to limit the present application. For those skilled in the art, the present application may be implemented without some of these specific details. The following description of the embodiments is merely to provide a better understanding of the present application by illustrating examples of the present application.

It should be noted that, relational terms herein such as first and second are used only for distinguishing one entity or operation from another entity or operation, and do not necessarily require or imply any such actual relationship or order between these entities or operations. Moreover, the terms "comprising", "including", or any other variation thereof, are intended to encompass a non-exclusive inclusion, such that a process, a method, an article or a device including a series of elements includes not only those elements, but also includes other elements that are not explicitly listed or elements inherent to such a process, a method, an article or a device. Without further limitation, an element defined by "comprising . . . " does not exclude presence of additional same elements in a process, a method, an article or a device that includes the element.

It should be understood that, the term "and/or" used herein is only a type of association relationship to describe associated objects, which indicates that there may be three types of relationships. For example, A and/or B may indicate the following three cases: A exists alone, A and B exist at the same time, and B exists alone. In addition, the character "/" herein generally indicates that associated objects before and after the character have an "or" relationship.

It should be noted that transistors in the embodiments of the present application may be either N-type transistors or P-type transistors. For an N-type transistor, a turn-on level is a high level and a turn-off level is a low level. That is, when a gate of the N-type transistor is at a high level, a first electrode and a second electrode of the N-type transistor are turned on, and when the gate of the N-type transistor is at a low level, the first electrode and the second to electrode of the N-type transistor are turned off. For a P-type transistor, a turn-on level is a low level and a turn-off level is a high level. That is, when a control end of the P-type transistor is at a low level, a first electrode and a second electrode of the P-type transistor are turned on, and when the control end of the P-type transistor is at a high level, the first electrode and the second electrode of the P-type transistor are turned off. In specific implementations, the gates of the above transistors are used as control electrodes thereof. Moreover, according to signals and types of the gates of the transistors, the first electrode can be used as a source, and the second electrode can be used as a drain, or the first electrode can be used as a drain, and the second electrode can be used as a source, which will not be distinguished herein. In addition, the turn-on level and the turn-off level in the embodiments of the present application are generalized, the turn-on level refers to any level that can make a transistor turn on, and the turn-off level refers to any level that can make the transistor turn off.

In the embodiments of the present application, the term "electrically connected" may refer to a direct electrical connection between two components, or may refer to an electrical connection between two components via one or more other components.

In the embodiments of the present application, a first node, a second node and a third node are only defined to facilitate the description of a circuit structure, and the first node, the second node and the third node are not actual circuit units.

It will be apparent to those skilled in the art that various modifications and variations can be made to the present application without departing from the spirit or scope of the present application. Accordingly, the present application is intended to cover the modifications and variations of the present application that fall within the scope of corresponding claims (claimed technical solutions) and their equivalents. It should be noted that, the implementations according to the embodiments of the present application may be combined with each other in the case of non-contradiction.

Before describing the technical solutions according to the embodiments of the present application, in order to facilitate understanding of the embodiments of the present application, the present application first specifically describes problems existing in the related art.

FIG. 1 is a schematic circuit diagram of a pixel circuit. As shown in FIG. 1, a pixel circuit may include a driving transistor M1', a data writing transistor M2', a threshold compensation transistor M3', and a light emitting control transistor M4'. A gate of the driving transistor M1' is electrically connected to a first node N1, and a first electrode of the driving transistor M1' is electrically connected to a third node N3. Due to influence of threshold shift characteristics of a transistor, the transistor cannot be fully turned off. Therefore, when a potential of a first electrode of a light emitting element D is lower than a potential of the first node N1, a charge of the first node N1 is transmitted to the first electrode of the light emitting element D through the threshold compensation transistor M3', the third node N3 and the light emitting control transistor M4'. That is, the first node N1 leaks a current to the first electrode of the light emitting element D, such that the potential of the first node N1 reduces. As the potential of the first node N1 reduces, a switching degree of the driving transistor M1' increases, such that a driving current of the driving transistor M1' increases, and the light emitting element D becomes brighter and brighter. That is, a light emitting luminance of the light emitting element deviates from a desired target luminance.

In addition, inventors of the present application further found that some types of current display apparatuses (such as hybrid TFT display apparatuses) usually use a one-drive-two design to narrow a border size, since a plurality set of scan drive signal lines are needed to drive sub-pixels to emit light. A hybrid TFT display apparatus (Hybrid TFT Display, HTD) is a display apparatus that has a thin film transistor (TFT) with indium gallium zinc oxide (IGZO) as an active layer and a TFT with polysilicon as the active layer in the pixel circuit. For the one-drive-two design, a scan drive circuit of the display apparatus includes a plurality of cascaded shift registers, each shift register may be electrically connected to two adjacent rows of scan signal lines, and each row of scan signal lines may be electrically connected to the pixel circuit in one row of sub-pixels. For example, as shown in FIG. 1, a gate of the threshold compensation transistor M3' is electrically connected to a scan signal line S1', and a same shift register may be electrically connected to two adjacent rows of scan signal line S1'. Among the two adjacent rows of scan signal lines S1', the scan signal line S1' of an i-th row is electrically connected to the gate of the threshold compensation transistor M3' in the pixel circuit of the i-th row, the scan signal line S1' of a (i+1)-th row is electrically connected to the gate of the threshold compensation transistor M3' in the pixel circuit of the (i+1)-th row, and i is a positive integer.

In this way, for the pixel circuit of the i-th row, during a period from when the pixel circuit of the i-th row writes a data signal to when the pixel circuit of the (i+1)-th row writes a data signal (that is, time of one row), the scan signal line S1 keeps outputting the turn-on level, the threshold compensation transistor M3' in the pixel circuit of the i-th row is always in a turn-on state. For a period of time before the light emitting element D emits light, the light emitting control transistor M4' is in a turn-on state, and the potential of the first electrode of the light emitting element D is lower than the potential of the first node N1. Therefore, a charge of the first node N1 is transmitted to the first electrode of the light emitting element D through the turned-on threshold compensation transistor M3', the third node N3 and the turned-on light emitting control transistor M4', that is, the first node N1 leaks a current to the first electrode of light emitting element D. For the pixel circuit of the (i+1)-th row, after the data signal is written into the pixel circuit of the i-th row, the scan signal line S1' is switched to output the turn-off level in a short time, that is, the threshold compensation transistor M3' in the pixel circuit of the (i+1)-th row is turned off very quickly. Therefore, a leakage amount of the first node N1 in the pixel circuit of the i-th row is greater than a leakage amount of the first node N1 in the pixel circuit of the (i+1)-th row, which causes that the light emitting element D connected to the pixel circuit of the i-th row is relatively bright, the light emitting element D connected to the pixel circuit of the (i+1)-th row is relatively dark, and therefore interlaced bright and dark lines appear. Especially for some wearable display apparatuses, the time for one row is 3 0~50 us, and a difference in leakage amount of the first node N1 in the pixel circuit of the i-th row and the first node N1 in the pixel circuit of the (i+1)-th row is more obvious, which further causes that the luminance difference of the light emitting elements of adjacent rows is more obvious.

In view of the above research findings, the embodiments of the present application provide a pixel circuit and a driving method thereof, and a display panel, which can solve the technical problems in the related art that the light emitting luminance of the light emitting element deviates from a desired target luminance and that the luminance difference of the light emitting elements of adjacent rows is obvious.

The technical idea of the embodiments of the present application is as follows: a first switch module and a voltage regulator module are added in the pixel circuit, the first switch module is electrically connected to a first end (i.e., an output end) of a driving module, and the voltage regulator module is electrically connected to a target node between the first switch module and a second switch module. In a light emitting stage, the first switch module is turned on in response to a turn-on level of a first light emitting control signal line, and the second switch module is turned on in response to a turn-on level of a second light emitting control signal line, such that the potential of the target node is equal to the potential of the first end of the driving module, and the voltage regulator module maintains the potential of the target node. Since the voltage difference between the potential of the first end of the driving module and the potential of the first node (the node connected to a control end of the driving module) is small, the voltage difference between the potential of the target node and the potential of the first node is small. Therefore, a leakage current of the first node to the target node through the threshold compensation module can be effectively reduced, thereby effectively preventing a light emitting luminance of the light emitting element from deviating from a desired target luminance, and improving a luminance stability of the display panel; at the same time, improving or even eliminating a luminance difference of different rows of the light emitting elements, and improving a luminance uniformity of the display panel.

The pixel circuit according to the embodiments of the present application is first introduced below.

Figure 2:
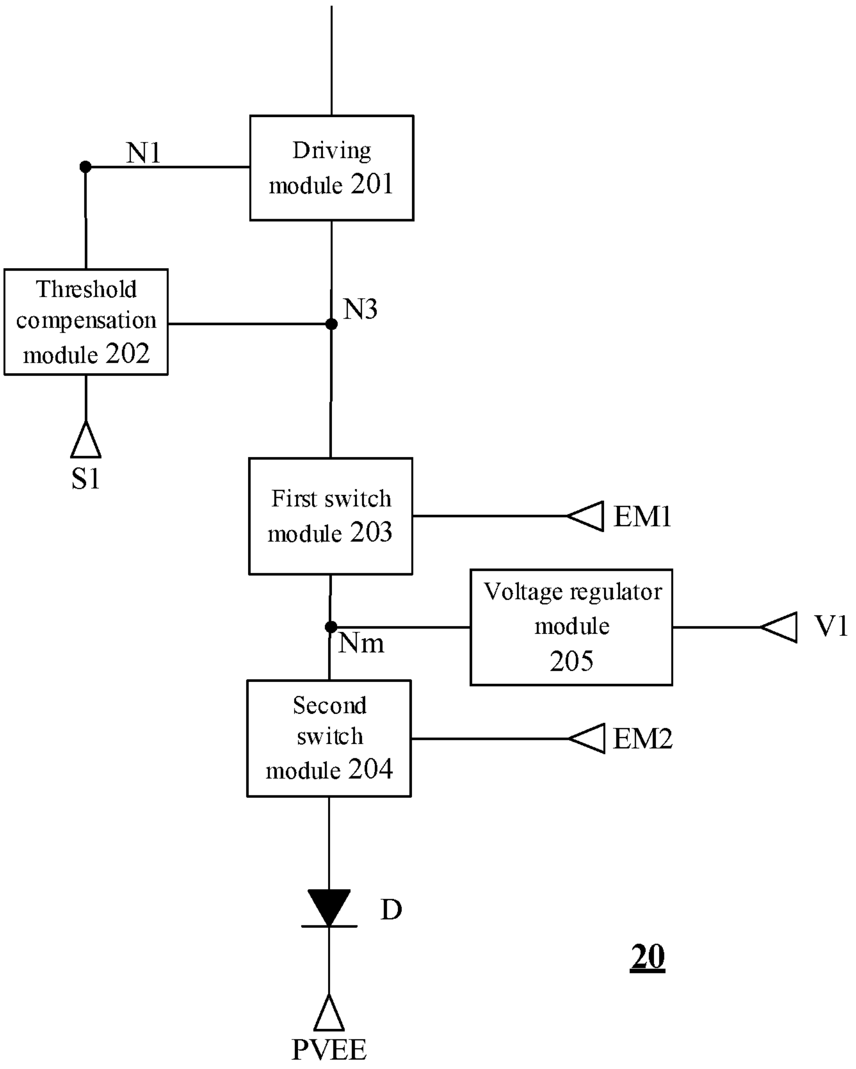
FIG. 2 is a schematic circuit diagram of a pixel circuit according to an embodiment of the present application.

FIG. 2 is a schematic circuit diagram of a pixel circuit according to an embodiment of the present application. As shown in FIG. 2, a pixel circuit 20 according to the embodiment of the present application may include a driving module 201, a threshold compensation module 202, a first switch module 203, a second switch module 204, and a voltage regulator module 205. A control end of the driving module 201 is electrically connected to the first node N1. A control end of the threshold compensation module 202 is electrically connected to a first scan signal line S1, a first end of the threshold compensation module 202 is electrically connected to the first node N1, and a second end of the threshold compensation module 202 is electrically connected to a first end of the driving module 201. For convenience of description, a node to which the first end of the driving module 201 is connected may be referred to as the third node N3. In a threshold compensation stage, the threshold compensation module 202 is turned on in response to a turn-on level transmitted by the first scan signal line S1, and is configured to connect the first end of the driving module 201 with the control end of the driving module 201, so as to realize a compensation for a threshold voltage of the driving module 201.

A control end of the first switch module 203 is electrically connected to a first light emitting control signal line EM1, and a first end of the first switch module 203 is electrically connected to the first end (i.e., the third node N3) of the driving module 201. A control end of the second switch module 204 is electrically connected to a second light emitting control signal line EM2, a first end of the second switch module 204 is electrically connected to a second end of the first switch module 203, and a second end of the second switch module 204 is electrically connected to the first electrode of the light emitting element D. The first electrode of the light emitting element D may be an anode of the light emitting element D. The anode of the light emitting element D may be formed of various electrically conductive materials. For example, the anode of the light emitting element D may be formed as a transparent electrode or a reflective electrode according to its use. When the anode is formed as a transparent electrode, it may be formed of, for example, indium tin oxide (ITO), indium zinc oxide (IZO), zinc oxide (ZnO), or indium oxide (In2O3). When the anode is formed as a reflective electrode, it may be formed of, for example, silver (Ag), magnesium (Mg), aluminum (Al), platinum (Pt), palladium (Pd), gold (Au), nickel (Ni), neodymium (Nd), iridium (Ir), chromium (Cr) or their mixtures.

A first end of the voltage regulator module 205 is electrically connected to a constant voltage signal line V1, and a second end of the voltage regulator module 205 is electrically connected to a target node Nm. The target node Nm is a connection node between the first end of the second switch module 204 and the second end of the first switch module 203, that is, the target node Nm is electrically connected to the first end of the second switch module 204 and the second end of the first switch module 203 at the same time. The constant voltage signal line V1 provides a constant voltage signal to the first end of the voltage regulator module 205, such that the voltage regulator module can maintain the potential of the target node Nm. In some examples, the constant voltage signal line V1 may be a positive voltage signal line that outputs a positive voltage signal, such as a positive voltage signal of +3V, +5V, or other positive voltage values. In other examples, the constant voltage signal line V1 may also be a negative voltage signal line that outputs a negative voltage signal, such as a negative voltage signal of −3V, −5V or other negative voltage values, which is not limited in the embodiments of the present application.

In a light emitting stage, the first switch module 203 is turned on in response to the turn-on level of the first light emitting control signal line EM1, the second switch module 204 is turned on in response to the turn-on level of the second light emitting control signal line EM2, and the light emitting element D emits light. The voltage signal (i.e., charge) of the third node N3 is transmitted to the target node Nm through the turned-on first switch module 203, such that the potential of the target node Nm is equal to the potential of the first end of the driving module 201 (i.e., the third node N3), and the voltage regulator module 205 maintains the potential of the target node Nm. For example, after measurement in some experiments, in the light emitting stage, the potential of the first node N1 is about 1~2 volts, and the potential of the third node N3 is about 1.5 volts, that is, the voltage difference between the potential of the first node N1 and the potential of the third node N3 is only about −0.50.5 volts. However, in the related art, the voltage difference between the potential of the first node N1 and the potential of the first electrode of the light emitting element D is 4~5 volts. Obviously, the voltage difference between the potential of the first node N1 and the potential of the third node N3 is significantly smaller than the voltage difference between the potential of the first node N1 and the potential of the first electrode of the light emitting element D.

Since the voltage difference between the potential of the first end of the driving module 201 (i.e., the third node N3) and the potential of the first node N1 is small, while the potential of the target node Nm is equal to the potential of the first end (i.e., the third node N1) of the driving module 201, the voltage difference between the potential of the target node Nm and the potential of the first node N1 is small. Therefore, the leakage current of the first node N1 to the target node Nm through the threshold compensation module can be effectively reduced, thereby effectively preventing the light emitting luminance of the light emitting element from deviating from the desired target luminance, and improving the luminance stability of the display panel; at the same time, improving or even eliminating the luminance difference of different rows of the light emitting elements, and improving the luminance uniformity of the display panel.

For example, during a period of time (referred to as a first time period) from when the first switch module 203 is turned on in a current frame to transmit the charge of the third node N3 to the target node Nm to when the first switch module 203 is turned on in a next frame to transmit the charge of the third node N3 to the target node Nm again, the potential of the target node Nm maintains a target potential, and the target potential is the potential of the third node N3 in the light emitting stage of the current frame. Then, in the first time period, since the voltage difference between the potential of the target node Nm and the potential of the first node N1 is small, the leakage current of the first node N1 to the target node Nm through the threshold compensation module can be effectively reduced.

Figure 3:
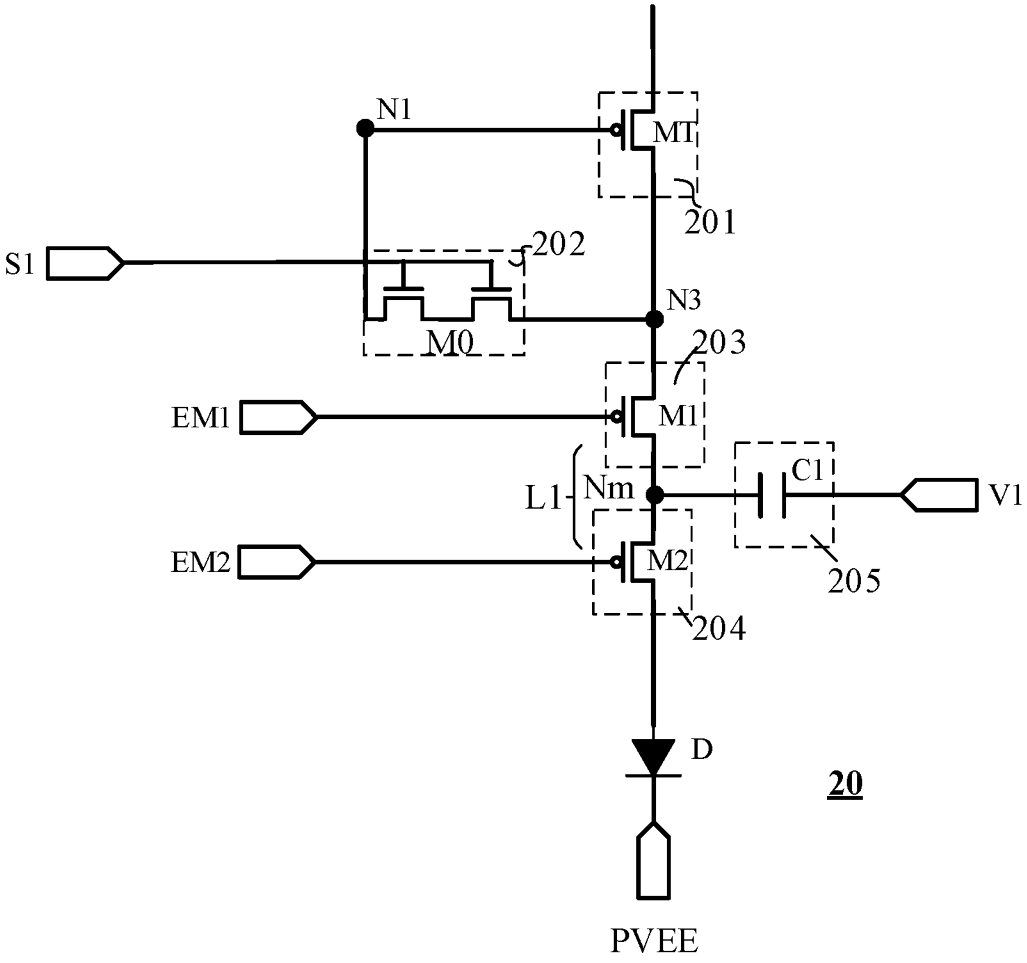
FIG. 3 is a schematic circuit diagram of another pixel circuit according to an embodiment of the present application.

FIG. 3 is a schematic circuit diagram of another pixel circuit according to an embodiment of the present application. As shown in FIG. 3, according to some embodiments of the present application, optionally, the driving module 201 may include a driving transistor MT, the threshold compensation module 202 may include a threshold compensation transistor M0, the first switch module 203 may include a first transistor M1, the second switch module 204 may include a second transistor M2, and the voltage regulator module 205 may include a first storage capacitor C1.

A gate of the driving transistor MT is electrically connected to the first node N1, and a first electrode of the driving transistor MT is electrically connected to the third node N3.

A gate of the threshold compensation transistor M0 is electrically connected to the first scan signal line S1, a first electrode of the threshold compensation transistor M0 is electrically connected to the first node N1, and a second electrode of the threshold compensation transistor M0 is electrically connected to the third node N3.

A gate of the first transistor M1 is electrically connected to the first light emitting control signal line EM1, and a first electrode of the first transistor M1 is electrically connected to the third node N3. A gate of the second transistor M2 is electrically connected to the second light emitting control signal line EM2, a first electrode of the second transistor M2 is electrically connected to a second electrode of the first transistor M1, and a second electrode of the second transistor M2 is electrically connected to the first electrode of the light emitting element D.

A first electrode plate of the first storage capacitor C1 is electrically connected to the constant voltage signal line V1, and a second electrode plate of the first storage capacitor C1 is electrically connected to the target node Nm.

In the light emitting stage, the first transistor M1 is turned on in response to the turn-on level of the first light emitting control signal line EM1, and the second transistor M2 is turned on in response to the turn-on level of the second light emitting control signal line EM2. The voltage signal of the third node N3 is transmitted to the target node Nm through the turned-on first transistor M1, such that the potential of the target node Nm is equal to the potential of the third node N3, and the first storage capacitor C1 maintains the potential of the target node Nm. Since the voltage difference between the potential of the third node N3 and the potential of the first node N1 is small, while the potential of the target node Nm is equal to the potential of the third node N3, the voltage difference between the potential of the target node Nm and the potential of the first node N1 is small. Therefore, the leakage current of the first node N1 to the target node Nm through the threshold compensation transistor can be effectively reduced, thereby effectively preventing the light emitting luminance of the light emitting element from deviating from the desired target luminance, and improving the luminance stability of the display panel; at the same time, improving or even eliminating the luminance difference of different rows of the light emitting elements, and improving the luminance uniformity of the display panel.

Figure 4:
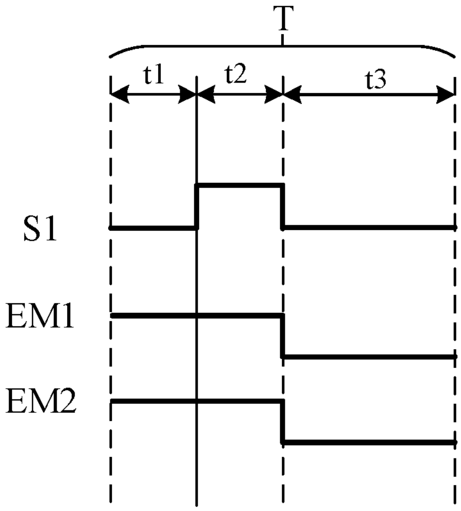
FIG. 4 is a schematic diagram of a driving sequence of a pixel circuit according to an embodiment of the present application.

FIG. 4 is a schematic diagram of a driving sequence of a pixel circuit according to an embodiment of the present application. As shown in FIG. 4, according to some embodiments of the present application, optionally, time T of a frame may include an initialization stage t1, a threshold compensation stage t2 and a light emitting stage t3. The time T of a frame may be understood as time during which the display panel where the pixel circuit 20 is located displays one frame of picture. With reference to FIG. 2, in the initialization stage t1, the first scan signal line S1, the first light emitting control signal line EM1 and the second light emitting control signal line EM2 all output a turn-off level. In the threshold compensation stage t2, the first scan signal line S1 outputs a turn-on level, and the threshold compensation module 202 is turned on, thereby realizing the compensation for the threshold voltage of the driving module 201. In the light emitting stage t3, the first light emitting control signal line EM1 and the second light emitting control signal line EM2 output a turn-on level, the first switch module 203 and the second switch module 204 are turned on, and the light emitting element D emits light.

The potential of the first node N1 is different in different stages among the initialization stage t1, the threshold compensation stage t2, and the light emitting stage t3. In the embodiment shown in FIG. 4, an absolute value of the difference between the potential of the target node Nm in a first target stage and the potential of the first node N1 in the light emitting stage t3 may be less than 4 volts. The first target stage may include the light emitting stage t3 of a current frame to the light emitting stage t3 of a next frame. That is, during a period of time from when the first switch module 203 is turned on in the current frame to transmit the charge of the third node N3 to the target node Nm until to when the first switch module 203 is turned on in the next frame to transmit the charge of the third node N3 to the target node Nm again, the potential of the target node Nm maintains a target potential, and the target potential is the potential of the third node N3 in the light emitting stage of the current frame.

In the embodiments of the present application, the absolute value of the difference between the potential of the target node Nm and the potential of the first node N1 in the light emitting stage t3 may be less than 4 volts, that is, less than a voltage difference between the potential of the first node N1 and the potential of the first electrode of the light emitting element D in the related art. In this way, it can be ensured that the voltage difference between the potential of the target node Nm and the potential of the first node N1 is small, so the leakage current of the first node N1 to the target node Nm through the threshold compensation transistor can be effectively reduced, thereby effectively preventing the light emitting luminance of the light emitting element from deviating from the desired target luminance, and improving the luminance stability of the display panel; at the same time, improving or even eliminating the luminance difference of different rows of the light emitting elements, and improving the luminance uniformity of the display panel.

As shown in FIG. 2 or FIG. 3, according to some embodiments of the present application, optionally, the first light emitting control signal line EM1 and the second light emitting control signal line EM2 may be a same signal line. Specifically, as shown in FIG. 4, in some embodiments, a voltage signal output by the first light emitting control signal line EM1 and a voltage signal output by the second light emitting control signal line EM2 may be the same, that is, the first switch module 203 and the second switch module 204 are turned on and turned off at the same time. Therefore, in some embodiments, the first light emitting control signal line EM1 and the second light emitting control signal line EM2 may be a same signal line.

In this way, a number of wirings in the display panel where the pixel circuit is located and a number of shift registers can be reduced, a wiring space can be saved, so as to facilitate realizing a narrow border.

Figure 5:
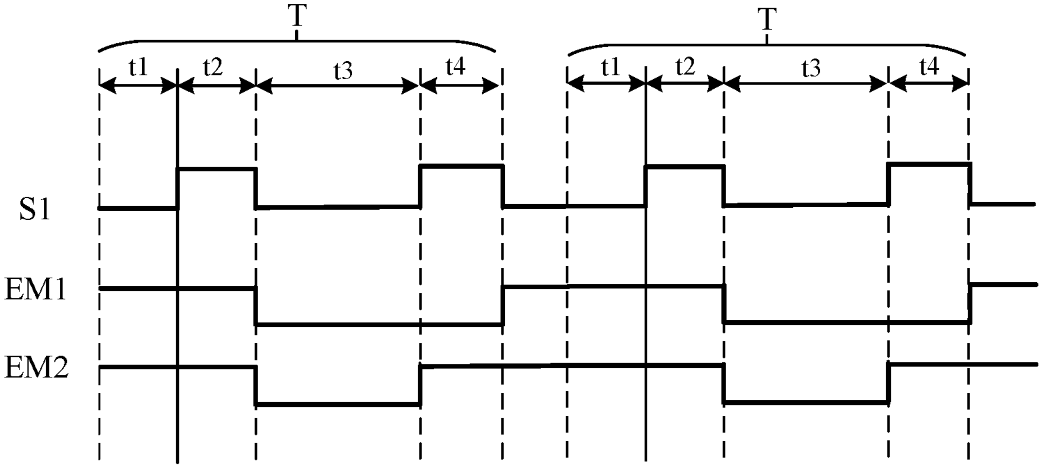
FIG. 5 is a schematic diagram of another driving sequence of a pixel circuit according to an embodiment of the present application.

FIG. 5 is a schematic diagram of another driving sequence of a pixel circuit according to an embodiment of the present application. As shown in FIG. 5, different from the embodiment shown in FIG. 4, according to some other embodiments of the present application, optionally, the time T of a frame may include the initialization stage t1, the threshold compensation stage t2, the light emitting stage t3, and a reset stage t4. The reset stage t4 of an i-th frame is located after the light emitting stage t3 of the i-th frame and before the initialization stage t1 of a (i+1)-th frame, that is, between the light emitting stage t3 of the i-th frame and the initialization stage t1 of the (i+1)-th frame, wherein i is a positive integer.

With reference to FIG. 2, in the reset stage t4, the threshold compensation module 202 is turned on in response to the turn-on level of the first scan signal line S1, and the first switch module 203 is turned on in response to the turn-on level of the first light emitting control signal line EM1. The voltage signal (i.e., charge) of the first node N1 is sequentially transmitted to the target node Nm through the threshold compensation module 202 and the first switch module 203. In the reset stage t4, since the potential of the first node N1 has not been reset, the potential of the first node N1 in the reset stage t4 is the same as or similar to the potential of the first node N1 in the light emitting stage t3. Therefore, in the reset stage t4 of the i-th frame, the potential of the target node Nm is the same as or similar to the potential of the first node N1 in the light emitting stage t3 of the i-th frame, and the voltage regulator module 205 maintains the potential of the target node Nm, until the first switch module 203 is turned on in the light emitting stage t3 of the (i+1)-th frame to transmit the charge of the third node N3 to the target node Nm again. That is, from the light emitting stage of the i-th frame to the reset stage of the i-th frame, the potential of the target node Nm is the same as the potential of the third node N3 in the light emitting stage t3 of the i-th frame; from the reset stage of the i-th frame to the light emitting stage of the (i+1)-th frame, the potential of the target node Nm is the same as or similar to the potential of the first node N1 in the light emitting stage t3 of the i-th frame.

Since a potential change of the first node N1 in adjacent frames is small, the voltage difference between the potential of the first node N1 in the light emitting stage t3 of the i-th frame and the potential of the first node N1 in the light emitting stage t3 of the (i+1)-th frame is small. As analyzed above, in the light emitting stage, the voltage difference between the potential of the third node N3 and the potential of the first node N1 is small. Therefore, regardless of whether the potential of the target node Nm is the same as the potential of the third node N3 or the potential of the first node N1 in the light emitting stage t3 of a previous frame, at least in the light emitting stage of the current frame, the voltage difference between the potential of the target node Nm and the potential of the first node N1 is enabled to be small. Therefore, the leakage current of the first node N1 to the target node Nm through the threshold compensation module can be effectively reduced, thereby effectively preventing the light emitting luminance of the light emitting element from deviating from the desired target luminance, and improving the luminance stability of the display panel; at the same time, improving or even eliminating the luminance difference of different rows of the light emitting elements, and improving the luminance uniformity of the display panel.

As shown in FIG. 5, in the reset stage t4, the second light emitting control signal line EM2 may output a turn-off level, such that the second switch module 204 is turned off. On one hand, it can be ensured that the charge of the first node N1 is successfully stored in the voltage regulator module without being lost through the second switch module 204, such that the potential of the target node reaches the potential of the first node N1. On the other hand, it may prevent the light emitting element D from being lit. That is to say, in the embodiment shown in FIG. 5, the voltage signal output by the first light emitting control signal line EM1 is different from the voltage signal output by the second light emitting control signal line EM2. Therefore, with reference to FIG. 2, in some embodiments, the first light emitting control signal line EM1 and the second light emitting control signal line EM2 are different signal lines. At least in the reset stage t4, a signal transmitted by the first light emitting control signal line EM1 is different from a signal transmitted by the second light emitting control signal line EM2. For example, in the reset stage t4, the first light emitting control signal line EM1 transmits a turn-on level, and the second light emitting control signal line EM2 transmits a turn-off level.

Figure 6:
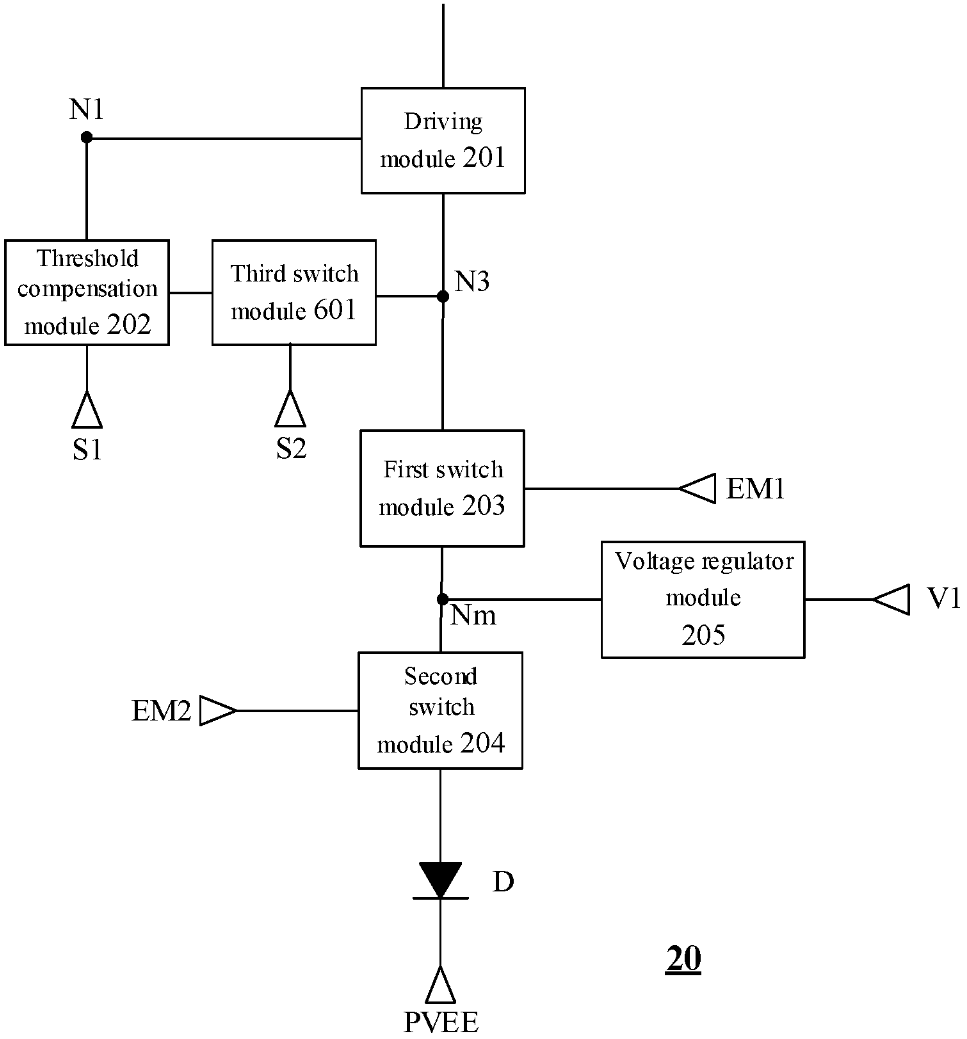
FIG. 6 is a schematic circuit diagram of yet another pixel circuit according to an embodiment of the present application.

FIG. 6 is a schematic circuit diagram of yet another pixel circuit according to an embodiment of the present application. As shown in FIG. 6, according to some embodiments of the present application, optionally, the pixel circuit 20 may further include a third switch module 601, a control end of the third switch module 601 is electrically connected to the second scan signal line S2, a first end of the third switch module 601 is electrically connected to the second end of the threshold compensation module 202, and a second end of the third switch module 601 is electrically connected to the first end (i.e., the third node N3) of the driving module 201. In the light emitting stage, the third switch module 601 is turned off in response to the turn-off level of the second scan signal line S2.

In this way, since the third switch module 601 is located between the threshold compensation module 202 and the third node N3, in the light emitting stage, the third switch module 601 is turned off, which can further reduce the leakage current of the first node N1 to the target node Nm through the threshold compensation module 202, thereby further effectively preventing the light emitting luminance of the light emitting element from deviating from the desired target luminance, and improving the luminance stability of the display panel; at the same time, improving or even eliminating the luminance difference of different rows of the light emitting elements, and further improving the luminance uniformity of the display panel.

Figure 7:
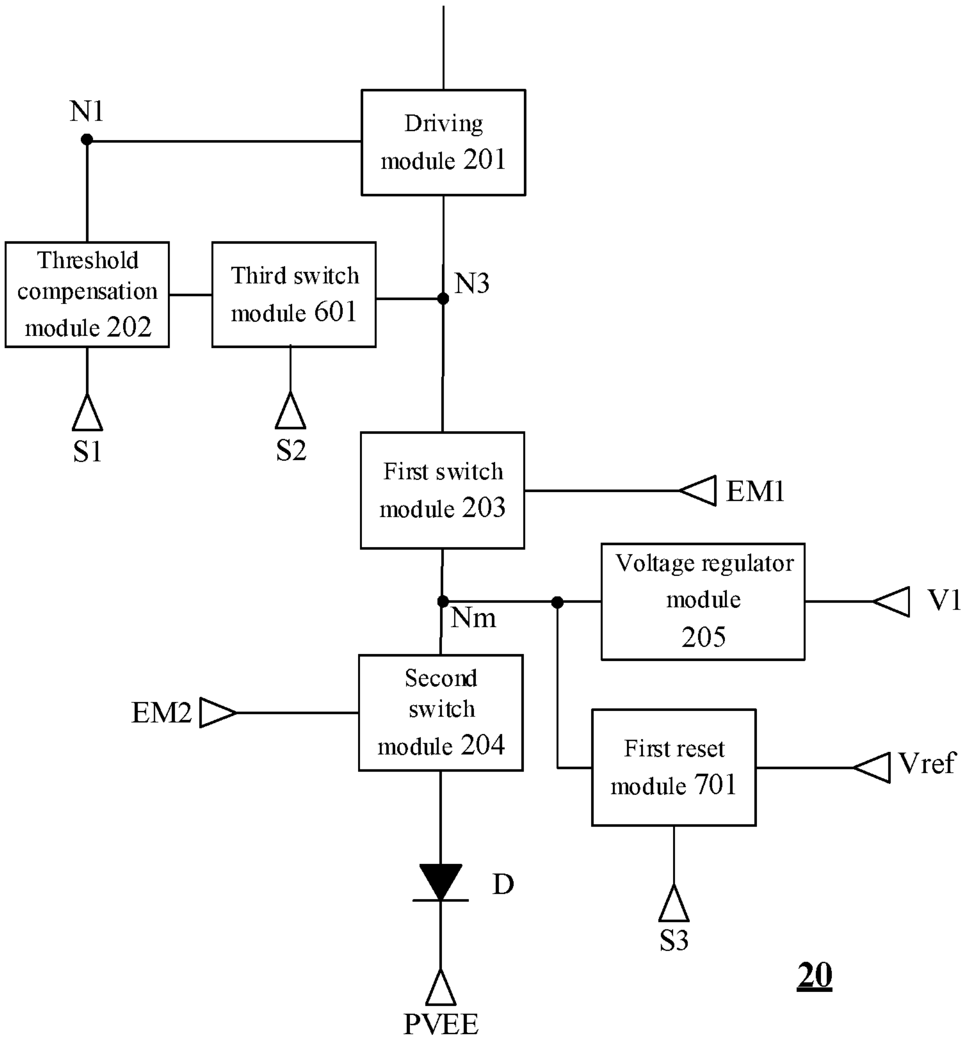
FIG. 7 is a schematic circuit diagram of yet another pixel circuit according to an embodiment of the present application.

FIG. 7 is a schematic circuit diagram of yet another pixel circuit according to an embodiment of the present application. As shown in FIG. 7, according to some embodiments of the present application, optionally, the pixel circuit 20 may further include a first reset module 701, a control end of the first reset module 701 is electrically connected to a third scan signal line S3, a first end of the first reset module 701 is electrically connected to a reference voltage signal line Vref, and a second end of the first reset module 701 is electrically connected to the second end of the voltage regulator module 205. Before the light emitting stage t3, for example, in the initialization stage t1 or the threshold compensation stage t2, the first reset module 701 is turned on in response to the turn-on level of the third scan signal line S3, and transmits the reference voltage signal from the reference voltage signal line Vref to the second end of the voltage regulator module 205, so as to reset the second end of the voltage regulator module 205.

In this way, before the light emitting stage t3, by resetting the second end of the voltage regulator module 205, it can be ensured that the potential of the third node N3 is successfully written to the target node Nm in the light emitting stage t3, or it can be ensured that the potential of the first node N1 is successfully written to the target node Nm in the reset stage t4.

Figure 8:
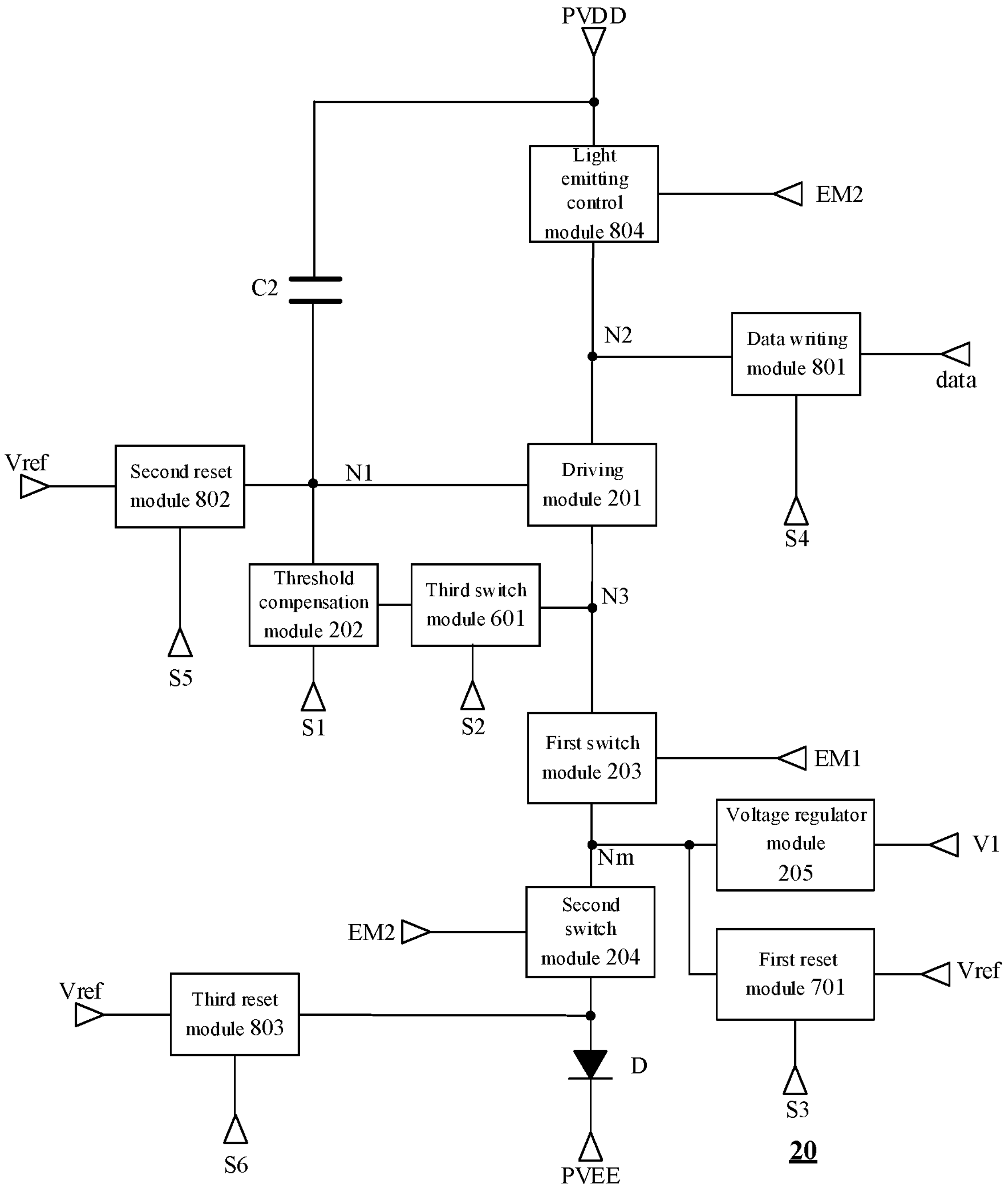
FIG. 8 is a schematic circuit diagram of yet another pixel circuit according to an embodiment of the present application.

FIG. 8 is a schematic circuit diagram of yet another pixel circuit according to an embodiment of the present application. As shown in FIG. 8, according to some embodiments of the present application, optionally, the pixel circuit 20 may further include a data writing module 801, a second reset module 802, a third reset module 803, a light emitting control module 804, and a second storage capacitor C2.

A control end of the data writing module 801 is electrically connected to a fourth scan signal line S4, a first end of the data writing module 801 is electrically connected to the data voltage signal line data, a second end of the data writing module 801 is electrically connected to the second end of the driving module 201, and the data writing module 801 is configured to transmit a data voltage signal from the data voltage signal line data to the second end of the driving module 201, so as to write the data voltage signal into the pixel circuit. For convenience of description, a node to which the second end of the driving module 201 is connected is referred to as a second node N2.

A control end of the second reset module 802 is electrically connected to a fifth scan signal line S5, a first end of the second reset module 802 is electrically connected to the reference voltage signal line Vref, a second end of the second reset module 802 is electrically connected to the first node N1, and the second reset module 802 is configured to transmit the reference voltage signal from the reference voltage signal line Vref to the first node N1, so as to reset the first node N1.

A control end of the third reset module 803 is electrically connected to a sixth scan signal line S6, a first end of the third reset module 803 is electrically connected to the reference voltage signal line Vref, a second end of the third reset module 803 is electrically connected to the first electrode of the light emitting element D, and the third reset module 803 is configured to transmit the reference voltage signal from the reference voltage signal line Vref to the first electrode of the light emitting element D, so as to reset the first electrode of the light emitting element D.

A control end of the light emitting control module 804 is electrically connected to the second light emitting control signal line EM2, a first end of the light emitting control module 804 is electrically connected to a first power supply voltage signal line PVDD, and a second end of the light emitting control module 804 is electrically connected to the second end (i.e., the second node N2) of the driving module 201. The first power supply voltage signal line PVDD is configured to provide a positive voltage signal, such as a voltage signal of +3.3V or other positive voltage values.

A first electrode plate of the second storage capacitor C2 is electrically connected to the first power supply voltage signal line PVDD, a second electrode plate of the second storage capacitor C2 is electrically connected to the first node N1, and the second storage capacitor C2 is configured to maintain the potential of the first node N1.

Continuing to refer to FIG. 8, in some specific embodiments, optionally, at least one of the threshold compensation module 202 and the second reset module 802 may include an N-type transistor, and at least one of the driving module 201, the data writing module 801, the second reset module 802, the third reset module 803, and the light emitting control module 804 may include a P-type transistor. For example, in some specific examples, the threshold compensation module 202 may be an N-type transistor, or the second reset module 802 may be an N-type transistor, or both the threshold compensation module 202 and the second reset module 802 may be an N-type transistor.

In this way, since a leakage current of an N-type transistor is smaller compared to that of a P-type transistor, if at least one of the threshold compensation module 202 and the second reset module 802 is an N-type transistor, the leakage current of the first node N1 can be further reduced, thereby further effectively preventing the light emitting luminance of the light emitting element from deviating from the desired target luminance, and improving the luminance stability of the display panel; at the same time, improving or even eliminating the luminance difference of different rows of the light emitting elements, and further improving the luminance uniformity of the display panel.

Continuing to refer to FIG. 8, in some specific embodiments, optionally, at least one of the threshold compensation module 202 and the second reset module 802 may include an oxide thin film transistor. Exemplarily, an active layer of the oxide thin film transistor is indium gallium zinc oxide (IGZO), and the oxide thin film transistor is IGZO-TFT. At least one of the driving module 201, the data writing module 801, the second reset module 802, the third reset module 803 and the light emitting control module 804 may include a low temperature polysilicon thin film transistor (LTPS-TFT).

In this way, since a leakage current of an oxide thin film transistor is small, if at least one of the threshold compensation module 202 and the second reset module 802 is an N-type transistor, the leakage current of the first node N1 can be further reduced, thereby further effectively preventing the light emitting luminance of the light emitting element from deviating from the desired target luminance, and improving the luminance stability of the display panel; at the same time, improving or even eliminating the luminance difference of different rows of the light emitting elements, and further improving the luminance uniformity of the display panel.

Figure 9:
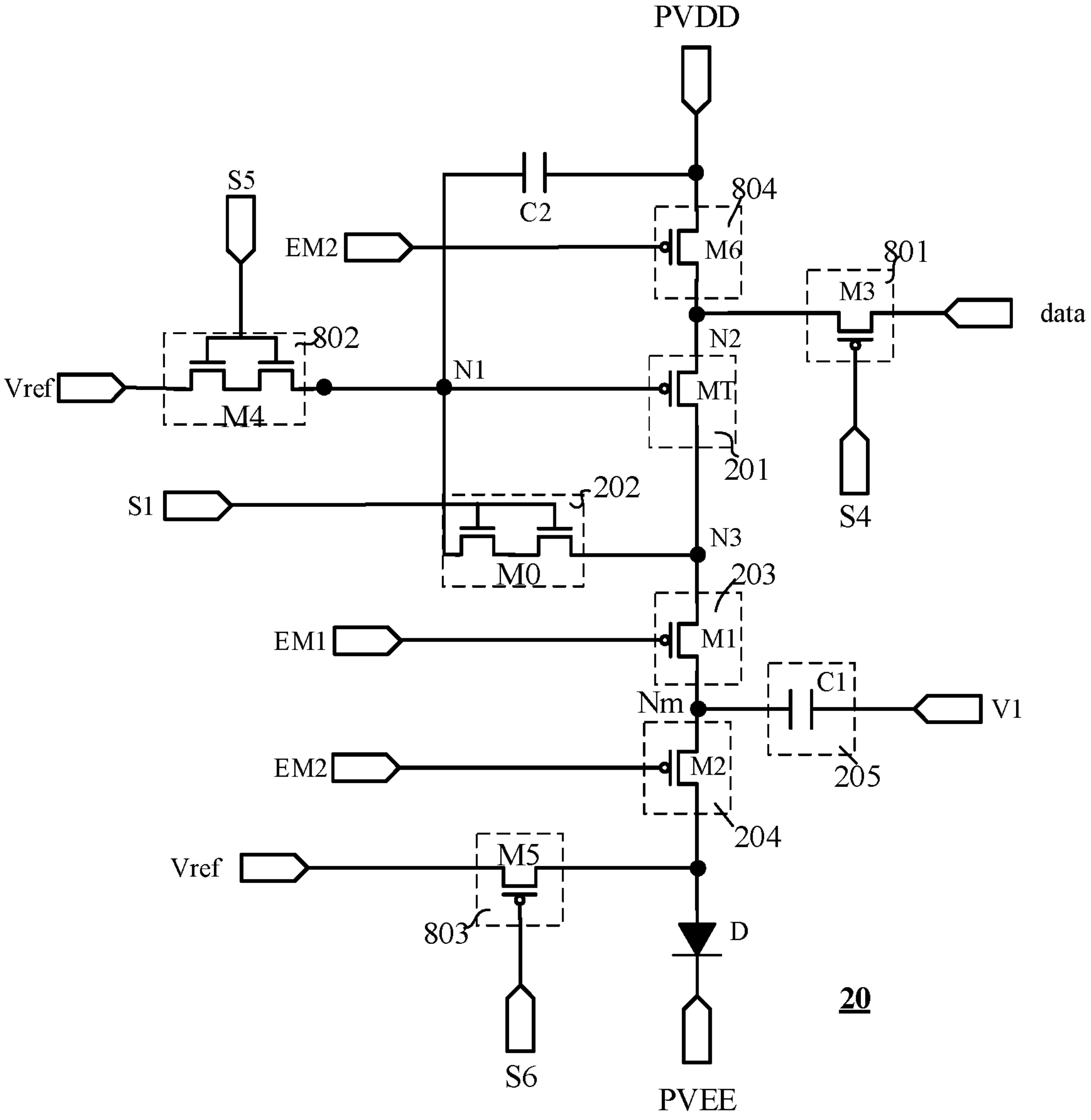
FIG. 9 is a schematic circuit diagram of yet another pixel circuit according to an embodiment of the present application.

FIG. 9 is a schematic circuit diagram of yet another pixel circuit according to an embodiment of the present application. As shown in FIG. 9, according to some embodiments of the present application, optionally, the data writing module 801 may include a third transistor M3, a gate of the third transistor M3 is electrically connected to the fourth scan signal line S4, a first electrode of the third transistor M3 is electrically connected to the data voltage signal line data, a second electrode of the third transistor M3 is electrically connected to the second end (i.e., the second node N2) of the driving module 201, and the third transistor M3 is configured to transmit the data voltage signal from the data voltage signal line data to the second end of the driving module 201, so as to write the data voltage signal into the pixel circuit.

The second reset module 802 may include a fourth transistor M4, a gate of the fourth transistor M4 is electrically connected to the fifth scan signal line S5, a first electrode of the fourth transistor M4 is electrically connected to the reference voltage signal line Vref, a second electrode of the fourth transistor M4 is electrically connected to the first electrode of the light emitting element D, and the fourth transistor M4 is configured to transmit the reference voltage signal from the reference voltage signal line Vref to the first node N1, so as to reset the first node N1.

The third reset module 803 may include a fifth transistor M5, a gate of the fifth transistor M5 is electrically connected to the sixth scan signal line S6, a first electrode of the fifth transistor M5 is electrically connected to the reference voltage signal line Vref, a second electrode of the fifth transistor M5 is electrically connected to the first electrode of the light emitting element D, and the fifth transistor M5 is configured to transmit the reference voltage signal from the reference voltage signal line Vref to the first electrode of the light emitting element D, so as to reset the first electrode of the light emitting element D.

The light emitting control module 804 may include a sixth transistor M6, a gate of the sixth transistor M6 is electrically connected to the second light emitting control signal line EM2, a first electrode of the sixth transistor M6 is electrically connected to the first power supply voltage signal line PVDD, a second electrode of the sixth transistor M6 is electrically connected to the second end (i.e., the second node N2) of the driving module 201, and the sixth transistor M6 is configured to control the light emitting element D to emit light.

For convenience of understanding, a working process of the pixel circuit will be described below with reference to the pixel circuit shown in FIG. 9 and the driving sequence shown in FIG. 10 and FIG. 11.

Figure 10:
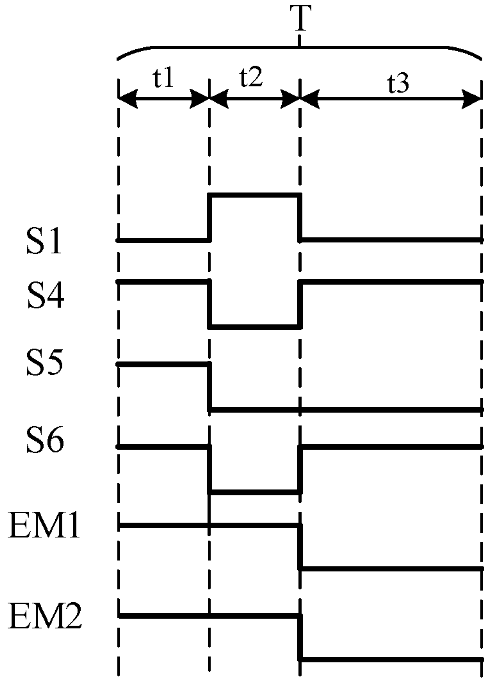
FIG. 10 is a schematic diagram of yet another driving sequence of a pixel circuit according to an embodiment of the present application.

FIG. 10 is a schematic diagram of yet another driving sequence of a pixel circuit according to an embodiment of the present application. As shown in FIG. 10, according to some embodiments of the present application, optionally, the time T of a frame may include the initialization stage t1, the threshold compensation stage t2 and the light emitting stage t3.

In the initialization stage t1, the fifth scan signal line S5 outputs an electrically conductive level, the fourth scan signal line S4, the sixth scan signal line S6, the first light emitting control signal line EM1 and the second light emitting control signal line EM2 output a turn-off level, the fourth transistor M4 is turned on in response to the turn-on level transmitted by the fifth scan signal line S5, and the fourth transistor M4 is configured to transmit the reference voltage signal from the reference voltage signal line Vref to the first node N1, so as to reset the first node N1.

In the threshold compensation stage t2, the first scan signal line S1, the fourth scan signal line S4 and the sixth scan signal line S6 output a turn-on level, and the first light emitting control signal line EM1 and the second light emitting control signal line EM2 output a turn-off level. The threshold compensation transistor M0 is turned on in response to the turn-on level transmitted by the first scan signal line S1, and the third transistor M3 is turned on in response to the turn-on level transmitted by the fourth scan signal line S4, so as to realize writing of a data voltage signal and compensation for a threshold voltage. The fifth transistor M5 is turned on in response to the turn-on level transmitted by the sixth scan signal line S6, and is configured to transmit the reference voltage signal from the reference voltage signal line Vref to the first electrode of the light emitting element D, so as to reset the first electrode of the light emitting element D.

In the light emitting stage t3, the first light emitting control signal line EM1 and the second light emitting control signal line EM2 output a turn-on level, and the first scan signal line S1, the fourth scan signal line S4, the fifth scan signal line S5 and the sixth scan signal line S6 output a turn-off level. The first transistor M1 is turned on in response to the turn-on level transmitted by the first light emitting control signal line EM1, the second transistor M2 and the sixth transistor M6 are turned on in response to the turn-on level transmitted by the second light emitting control signal line EM2, and the voltage signal of the third node N3 is transmitted to the target node Nm through the turned-on first transistor M1, such that the potential of the target node Nm is equal to the potential of the third node N3, and the first storage capacitor C1 maintains the potential of the target node Nm. At the same time, a driving current of the driving transistor MT is transmitted to the first electrode of the light emitting element D through the first transistor M1 and the second transistor M2, and the light emitting element D emits light.

In some specific examples, optionally, the fourth scan signal line S4 and the sixth scan signal line S6 may be a same signal line, such that a number of wirings in the display panel where the pixel circuit is located and a number of shift registers can be reduced, a wiring space can be saved, so as to facilitate realizing a narrow border.

In some specific examples, optionally, the sixth scan signal line S6 and the fourth scan signal line S4 may not be a same signal line, and in the initialization stage t1, the sixth scan signal line S6 outputs a turn-on level; in the threshold compensation stage t2, the sixth scan signal line S6 outputs a turn-off level, thereby resetting the first electrode of the light emitting element D in the initialization stage t1.

Figure 11:
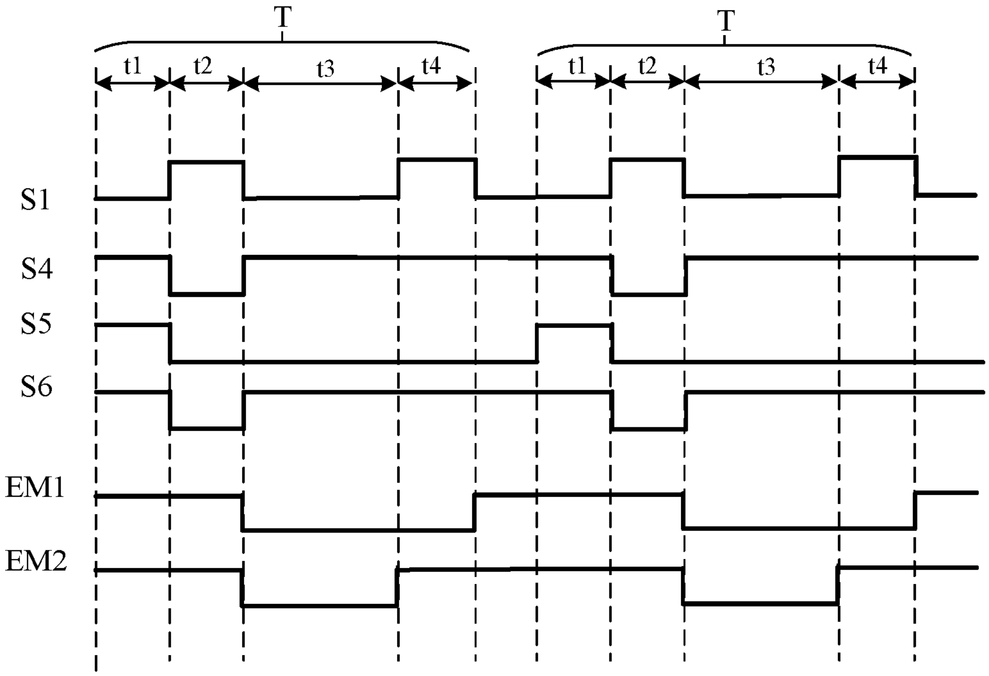
FIG. 11 is a schematic diagram of yet another driving sequence of a pixel circuit according to an embodiment of the present application.

FIG. 11 is a schematic diagram of yet another driving sequence of a pixel circuit according to an embodiment of the present application. As shown in FIG. 11, different from the embodiment shown in FIG. 10, according to some other embodiments of the present application, optionally, the time T of a frame may further include a reset stage t4, and the reset stage t4 of an i-th frame is located after the light emitting stage t3 of the i-th frame and before the initialization stage t1 of a (i+1)-th frame, that is, between the light emitting stage t3 of the i-th frame and the initialization stage t1 of the (i+1)-th frame, wherein i is a positive integer.

In the reset stage t4, the first scan signal line S1 and the first light emitting control signal line EM1 output a turn-on level, and the fourth scan signal line S4, the fifth scan signal line S5, the sixth scan signal line S6 and the second light emitting control signal line EM2 output a turn-off level. The threshold compensation transistor M0 is turned on in response to the turn-on level of the first scan signal line S1, the first transistor M1 is turned on in response to the turn-on level of the first light emitting control signal line EM1, and the voltage signal (i.e., charge) of the first node N1 is sequentially transmitted to the target node Nm through the threshold compensation transistor M0 and the first transistor M1. The second transistor M2 is turned off in response to the turn-off level of the second light emitting control signal line EM2, preventing the light emitting element D from being lit.

The initialization stage t1, the threshold compensation stage t2 and the light emitting stage t3 in the embodiment shown in FIG. 11 are the same as or similar to the initialization stage t1, the threshold compensation stage t2 and the light emitting stage t3 in the embodiment shown in FIG. 10, which will not be repeated herein for brevity of description.

Figure 12:
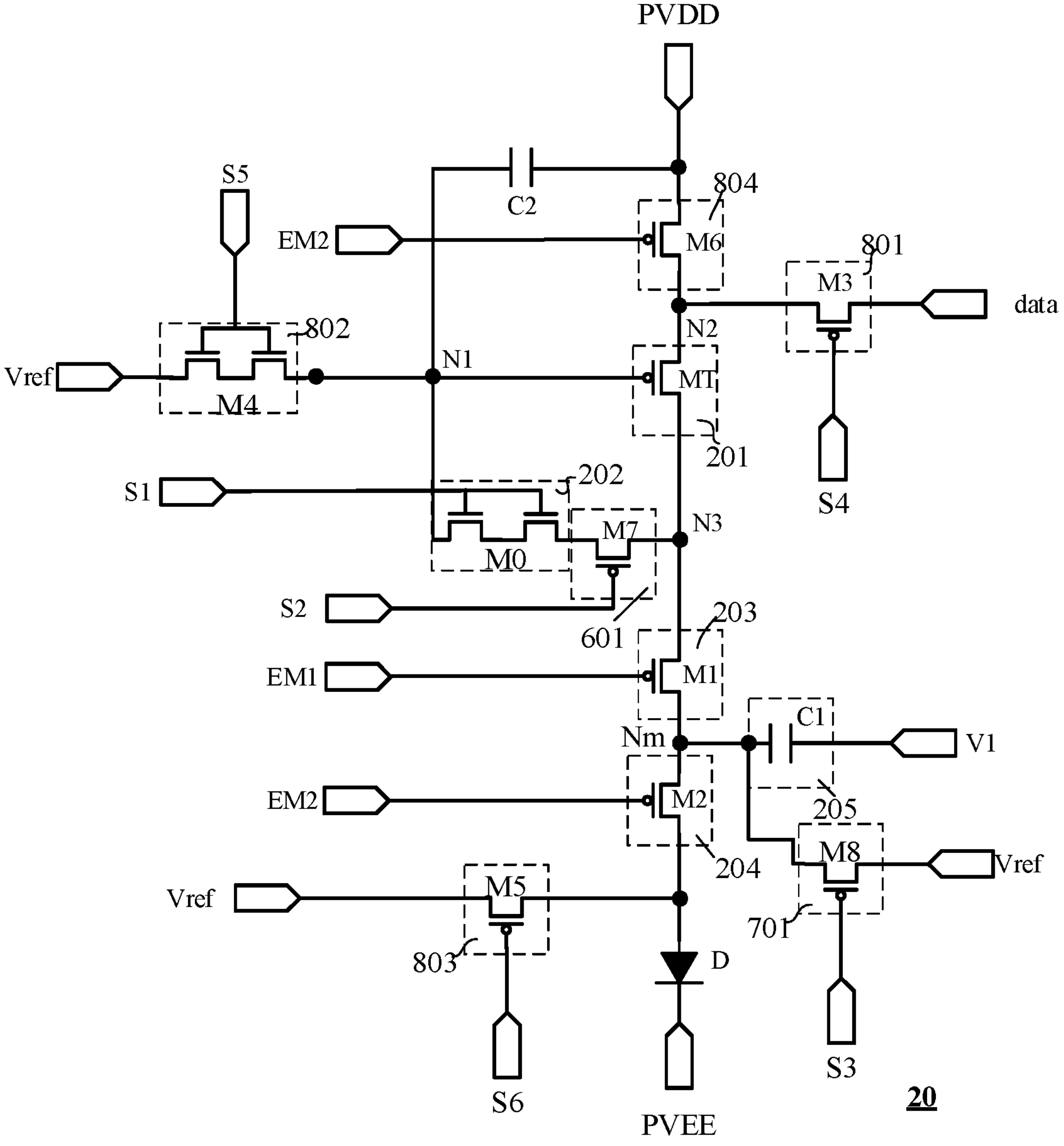
FIG. 12 is a schematic circuit diagram of yet another pixel circuit according to an embodiment of the present application.

FIG. 12 is a schematic circuit diagram of yet another pixel circuit according to an embodiment of the present application. As shown in FIG. 12, according to some embodiments of the present application, optionally, the third switch module 601 may include a seventh transistor M7, a gate of the seventh transistor M7 is electrically connected to the second scan signal line S2, a first electrode of the seventh transistor M7 is electrically connected to the second electrode of the threshold compensation transistor M0, and a second electrode of the seventh transistor M7 is electrically connected to the third node N3. In the light emitting stage, the seventh transistor M7 is turned off in response to the turn-off level of the second scan signal line S2.

In this way, since the seventh transistor M7 is located between the threshold compensation transistor M0 and the third node N3, in the light emitting stage, the seventh transistor M7 is turned off, which can further reduce the leakage current of the first node N1 to the target node Nm through the threshold compensation transistor M0, thereby further effectively preventing the light emitting luminance of the light emitting element from deviating from the desired target luminance, and improving the luminance stability of the display panel; at the same time, improving or even eliminating the luminance difference of different rows of the light emitting elements, and further improving the luminance uniformity of the display panel.

Continuing to refer to FIG. 12, according to some embodiments of the present application, optionally, the first reset module 701 may include an eighth transistor M8, a gate of the eighth transistor M8 is electrically connected to the third scan signal line S3, a first electrode of the eighth transistor M8 is electrically connected to the reference voltage signal line Vref, and a second end of the eighth transistor M8 is electrically connected to a second electrode plate of the first storage capacitor C1. Before the light emitting stage t3, for example, in the initialization stage t1 or the threshold compensation stage t2, the eighth transistor M8 is turned on in response to the turn-on level of the third scan signal line S3, and transmits the reference voltage signal from the reference voltage signal line Vref to the second electrode plate of the first storage capacitor C1, so as to reset the second electrode plate of the first storage capacitor C1.

In this way, before the light emitting stage t3, by resetting the second electrode plate of the first storage capacitor C1, it can be ensured that the potential of the third node N3 is successfully written to the target node Nm in the light emitting stage t3, or it can be ensured that the potential of the first node N1 is successfully written to the target node Nm in the reset stage t4.

Figure 13:
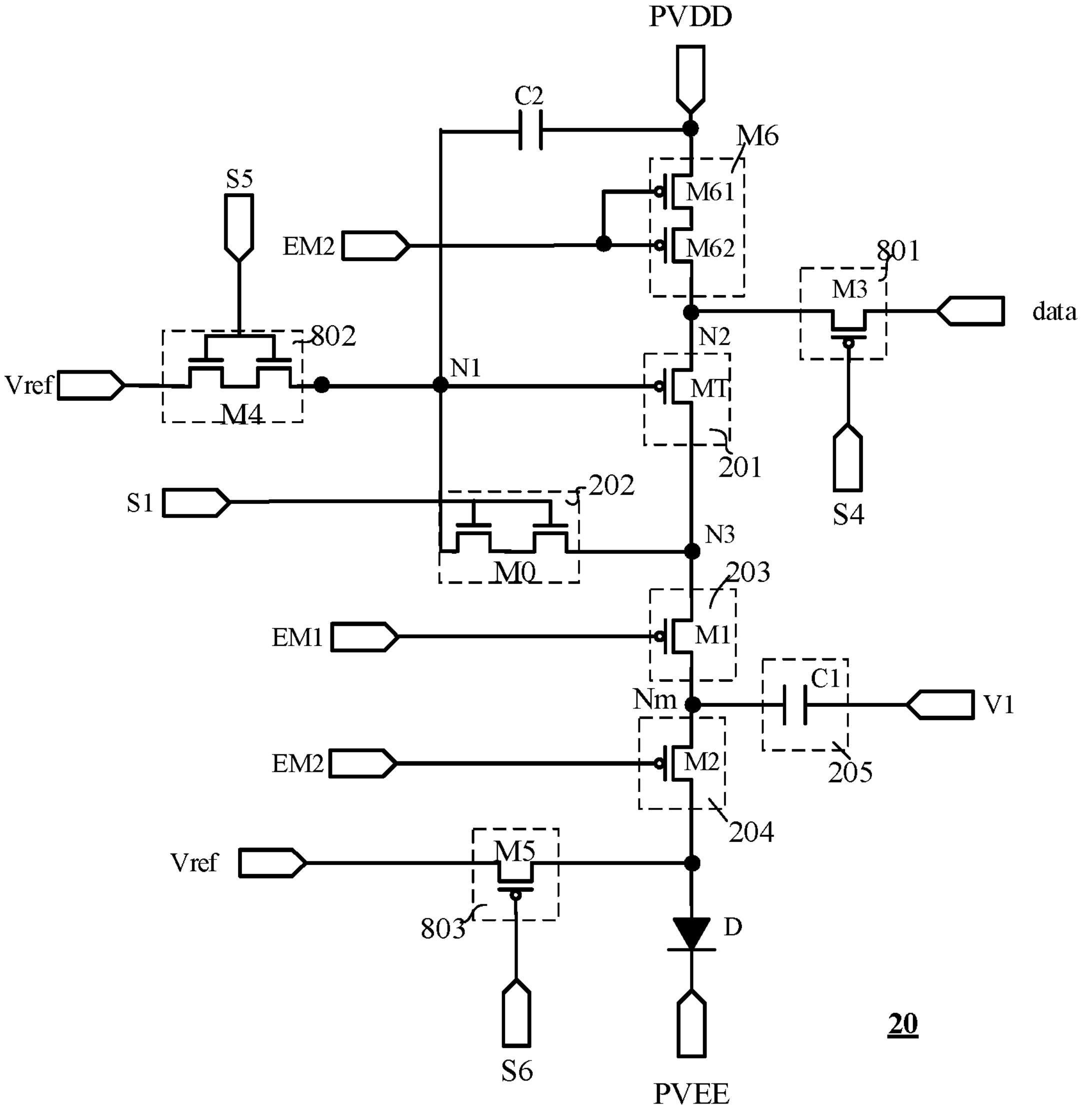
FIG. 13 is a schematic circuit diagram of yet another pixel circuit according to an embodiment of the present application.

FIG. 13 is a schematic circuit diagram of yet another pixel circuit according to an embodiment of the present application. As shown in FIG. 13, according to some embodiments of the present application, optionally, the sixth transistor M6 may include a first sub-transistor M61 and a second sub-transistor M62 disposed in series, a gate of the first sub-transistor M61 and a gate of the second sub-transistor M62 are all electrically connected to the second light emitting control signal line EM2, a first electrode of the first sub-transistor M61 is electrically connected to the first power supply voltage signal line PVDD, a second electrode of the first sub-transistor M61 is electrically connected to a first electrode of the sub-transistor M62, and a second electrode of the second sub-transistor M61 is electrically connected to the second end (i.e., the second node N2) of the driving module 201.

In this way, the first sub-transistor M61 and the second sub-transistor M62 constitute a dual-gate transistor, which can reduce a current of the first power supply voltage signal line PVDD, thereby reducing the luminance of the light emitting element D to compensate for an influence on the luminance of the light emitting element D due to the leakage current of the first node N1, such that the luminance of the light emitting element D is close to the desired target luminance.

Inventors of the present application further found that when the display panel switches images (for example, switches from a black state to a white image), due to a hysteresis effect, there is a problem of deviation between an actual offset amount and a desired target offset amount of a threshold voltage Vth of the driving transistor. For example, the offset amount of the threshold voltage Vth is too large, such that the luminance of the light emitting element cannot reach a preset luminance, and a display effect of the display panel is affected.

In view of the above findings, the present application considers adjusting the threshold voltage Vth of the driving transistor to reduce the deviation between the actual offset amount and the desired target offset amount of the threshold voltage Vth and to improve the display effect of the display panel.

Figure 14:
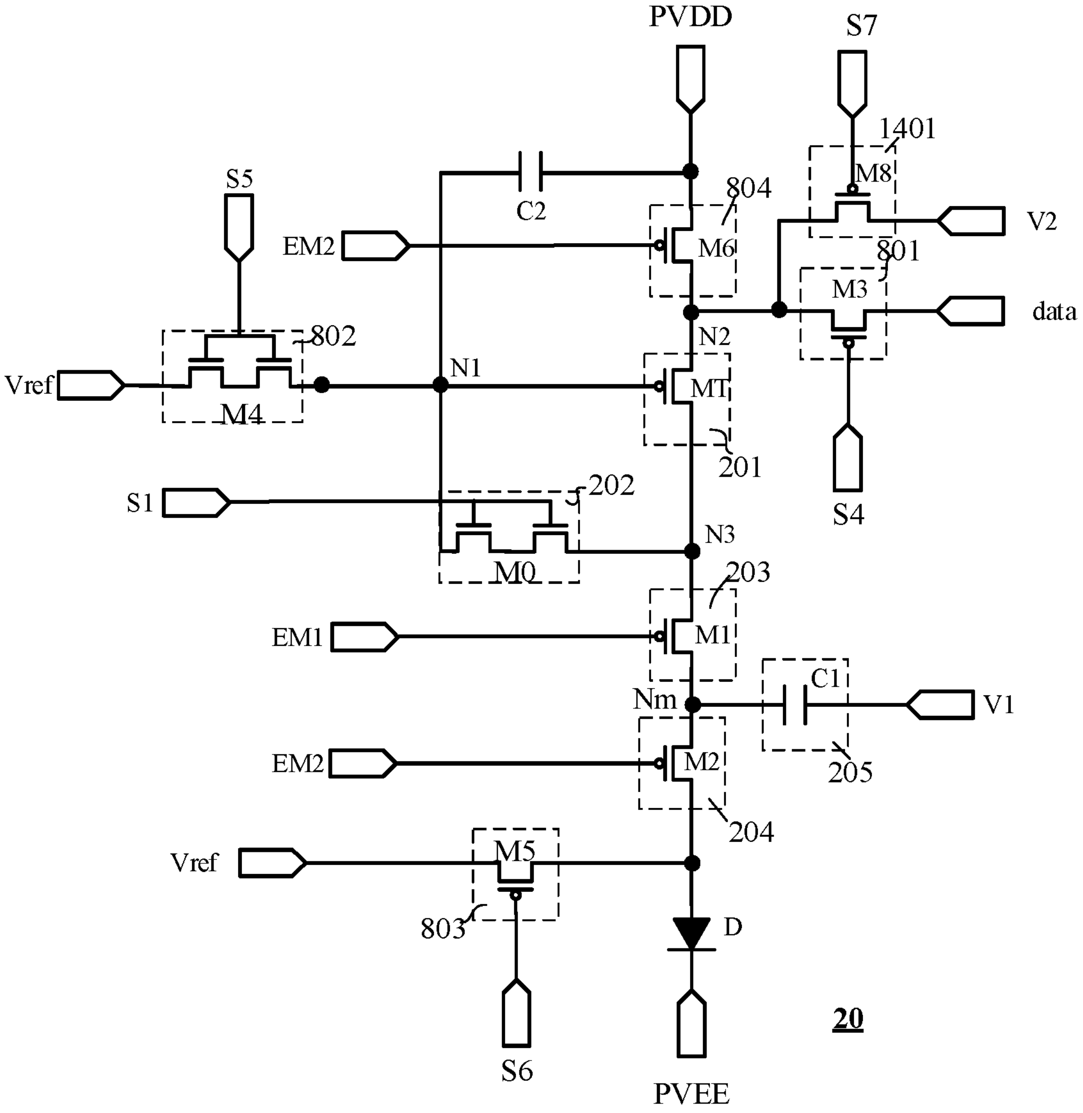
FIG. 14 is a schematic circuit diagram of yet another pixel circuit according to an embodiment of the present application.

FIG. 14 is a schematic circuit diagram of yet another pixel circuit according to an embodiment of the present application. As shown in FIG. 14, according to some embodiments of the present application, optionally, the pixel circuit 20 may further include an offset compensation module 1401, a control end of the offset compensation module 1401 is electrically connected to the seventh scan signal line S7, a first end of the offset compensation module 1401 is electrically connected to an offset compensation voltage signal line V2, and a second end of the offset compensation module 1401 is electrically connected to the second end (i.e., the second node N2) of the driving module 201.

Figure 15:
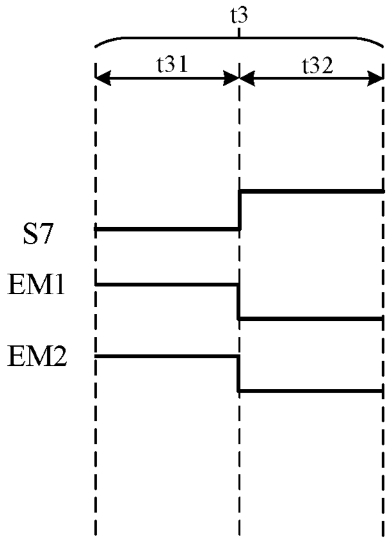
FIG. 15 is a schematic diagram of yet another driving sequence of a pixel circuit according to an embodiment of the present application.

FIG. 15 is a schematic diagram of yet another driving sequence of a pixel circuit according to an embodiment of the present application. With reference to FIG. 14 and FIG. 15, the light emitting stage t3 includes a first stage t31 and a second stage t32. In the first stage t31, the offset compensation module 1401 is turned on in response to the turn-on level of the seventh scan signal line S7, and transmits an offset compensation voltage signal of the offset compensation voltage signal line V2 to the second end of the driving module 201, so as to compensate for the threshold voltage of the driving module 201. In the second stage t32, the first switch module 203 is turned on in response to the turn-on level of the first light emitting control signal line EM1, the second switch module 204 is turned on in response to the turn-on level of the second light emitting control signal line EM2, and the light emitting element D emits light.

In this way, the threshold voltage Vth of the driving module 201 is adjusted by the offset compensation voltage, such that the threshold voltage Vth of the driving module 201 is adjusted in advance before the light emitting element D is driven to emit light, so as to reduce the deviation between the actual offset amount and the desired target offset amount of the threshold voltage Vth and improve the display effect of the display panel.

Continuing to refer to FIG. 14, in some specific embodiments, optionally, the offset compensation module 1401 may include the eighth transistor M8, the gate of the eighth transistor M8 is electrically connected to the seventh scan signal line S7, the first electrode of the eighth transistor M8 is electrically connected to the offset compensation voltage signal line V2, and a second electrode of the eighth transistor M8 is electrically connected to the second end (i.e., the second node N2) of the driving module 201. In the first stage t31, the eighth transistor M8 is turned on in response to the turn-on level of the seventh scan signal line S7, and transmits the offset compensation voltage signal of the offset compensation voltage signal line V2 to the second end of the driving module 201, so as to compensate for the threshold voltage of the driving module 201.

Figure 16:
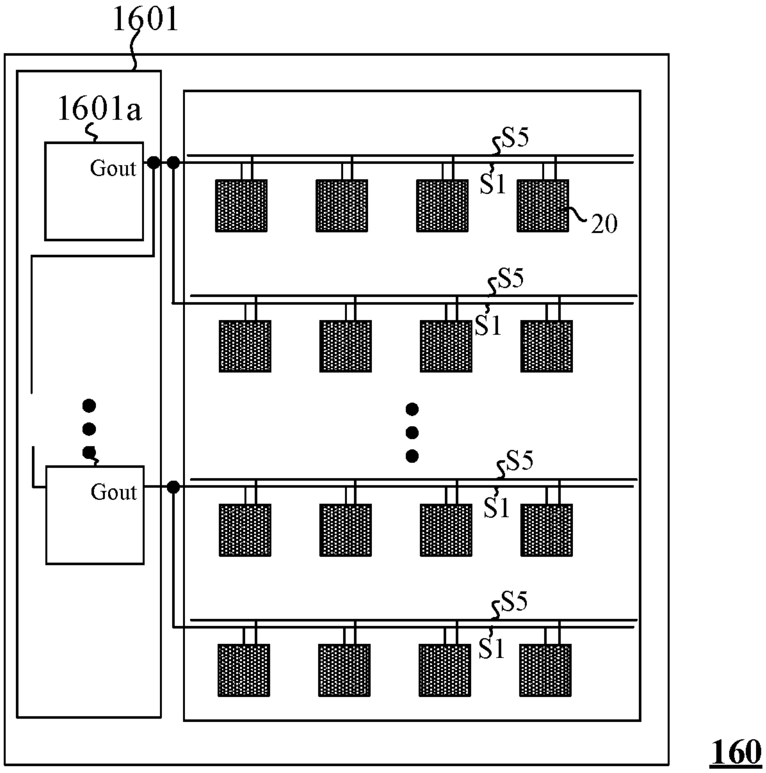
FIG. 16 is a schematic circuit diagram of a display panel where a pixel circuit according to an embodiment of the present application is located.

According to some embodiments of the present application, optionally, the display panel where the pixel circuit 20 is located may adopt a one-drive-two design. FIG. 16 is a schematic circuit diagram of a display panel where a pixel circuit according to an embodiment of the present application is located. With reference to FIG. 2 and FIG. 16, in some specific embodiments, optionally, the display panel 160 may include a first scan drive circuit 1601, and the first scan drive circuit 1601 may output a first scan drive signal for controlling the turn-on/turn-off of transistors in pixel circuits. The first scan drive circuit 1601 may include a plurality of cascaded first shift registers 1601*a*, that is, an input end of a (j+1)-th first shift register 1601*a* is electrically connected to an output end of a j-th first shift register 1601*a*, wherein j is a positive integer. Each first shift register 1601*a* may be electrically connected to the threshold compensation modules 202 in two adjacent rows of the pixel circuits through the first scan signal lines S1, wherein one row of the pixel circuits corresponds to one first scan signal line S1, and one row of the pixel circuits includes a plurality of pixel circuits 20.

In this way, the first scan drive signal is provided to two adjacent rows of the pixel circuits through one first shift register 1601*a*, which can reduce the number of the first shift registers 1601*a*, and is beneficial to realize a narrow border while reducing a production cost.

Figure 17:
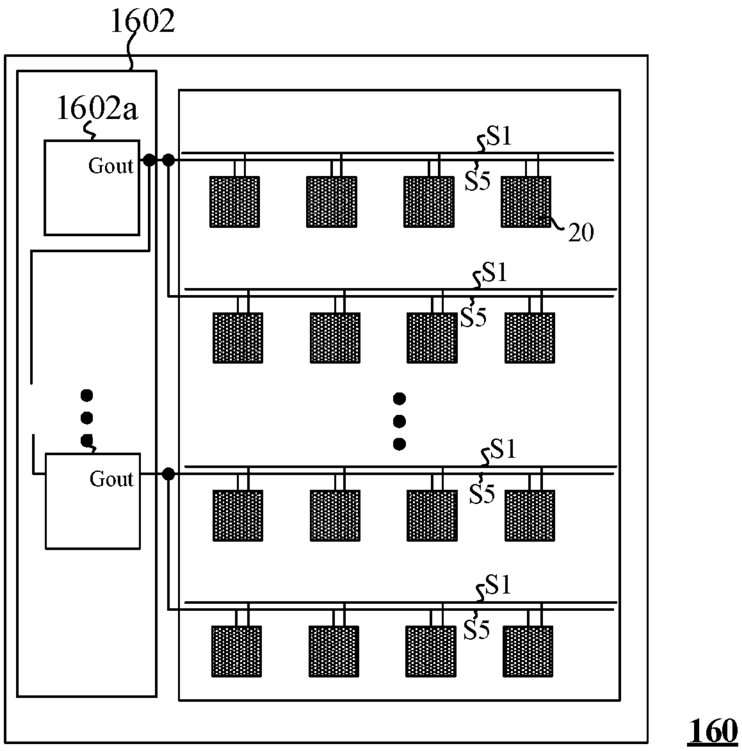
FIG. 17 is a schematic circuit diagram of another display panel where a pixel circuit according to an embodiment of the application is located.

FIG. 17 is a schematic circuit diagram of another display panel where a pixel circuit according to an embodiment of the application is located. With reference to FIG. 9 and FIG. 17, in some specific embodiments, optionally, the display panel 160 may further include a second scan drive circuit 1602, and the second scan drive circuit 1602 may output a second scan drive signal for controlling the turn-on/turn-off of transistors in the pixel circuits. The second scan drive circuit 1602 includes a plurality of cascaded second shift registers 1602*a*, that is, an input end of a (j+1)-th second shift register 1602*a* is electrically connected to an output end of a j-th second shift register 1602*a*, wherein j is a positive integer. Each second shift register 1602*a* may be electrically connected to the second reset modules 802 in two adjacent rows of the pixel circuits through the fifth scan signal lines S5, wherein one row of the pixel circuits corresponds to one fifth scan signal line S5, and one row of the pixel circuits includes a plurality of pixel circuits 20.

In this way, the second scan drive signal is provided to two adjacent rows of the pixel circuits through one second shift register 1602*a*, which can reduce the number of the second shift registers 1602*a*, and is beneficial to realize a narrow border while reducing a production cost.

It should be noted that, for convenience of illustration, the first scan drive circuit 1601 and the second scan drive circuit 1602 are respectively shown in two drawings. However, in practice, the display panel 160 may include both the first scan drive circuit 1601 and the second scan drive circuit 1602.

Figure 18:
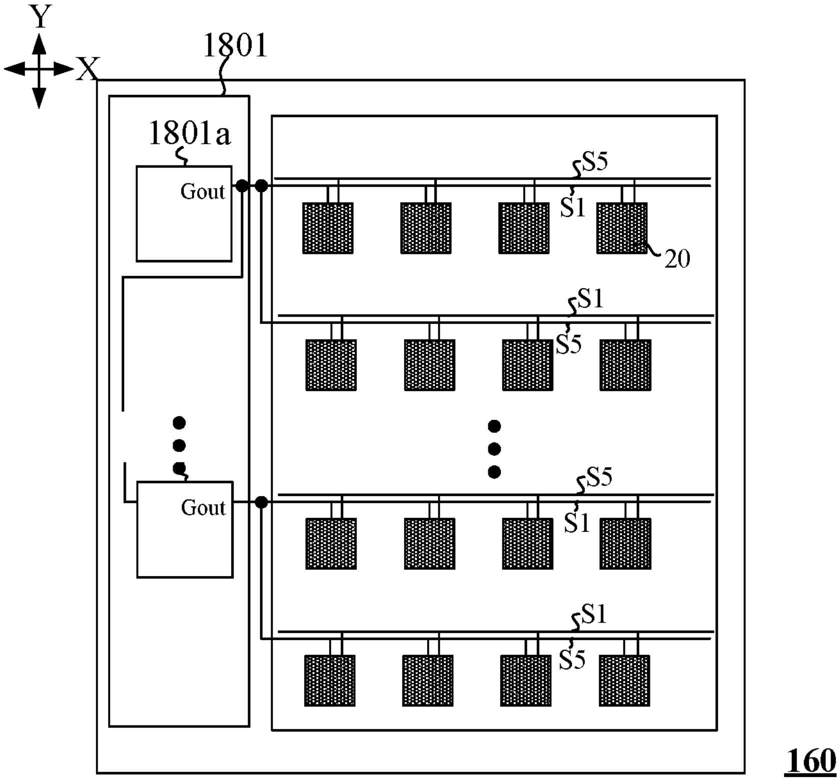
FIG. 18 is a schematic circuit diagram of yet another display panel where a pixel circuit according to an embodiment of the application is located.

FIG. 18 is a schematic circuit diagram of yet another display panel where a pixel circuit according to an embodiment of the application is located. With reference to FIG. 9 and FIG. 18, different from the embodiment shown in FIG. 16 and the embodiment shown in FIG. 17, in some other specific embodiments, optionally, if the scan signal output by the first scan signal line S1 and the scan signal output by the fifth scan signal line S5 are the same or similar (e.g., the width and period are the same or similar), the same shift register may be connected to the first scan signal line S1 and the fifth scan signal line S5 respectively. Specifically, the display panel 160 may include a scan drive circuit 1801, and the scan drive circuit 1801 includes a plurality of cascaded shift registers 1801*a*, that is, an input end of a (j+1)-th shift register 1801*a* is electrically connected to an output end of a j-th shift register 1801*a*, wherein j is a positive integer. Each shift register 1801*a* may be electrically connected to the threshold compensation modules 202 in a j-th row of the pixel circuits through the first scan signal line S1, and may be electrically connected to the second reset modules 802 in a (j+1)-th row of the pixel circuits through the fifth scan signal line S5, wherein one row of the pixel circuits includes a plurality of pixel circuits 20, and j is a positive integer.

In this way, scan drive signals can be provided to two adjacent rows of the pixel circuits through one shift register 1801*a*, which can reduce the number of shift registers 1801*a*, and is beneficial to realize a narrow border while reducing a production cost.

An arrangement of a film layer of the pixel circuit 20 will be described in detail below with reference to some specific embodiments.

Figure 19:
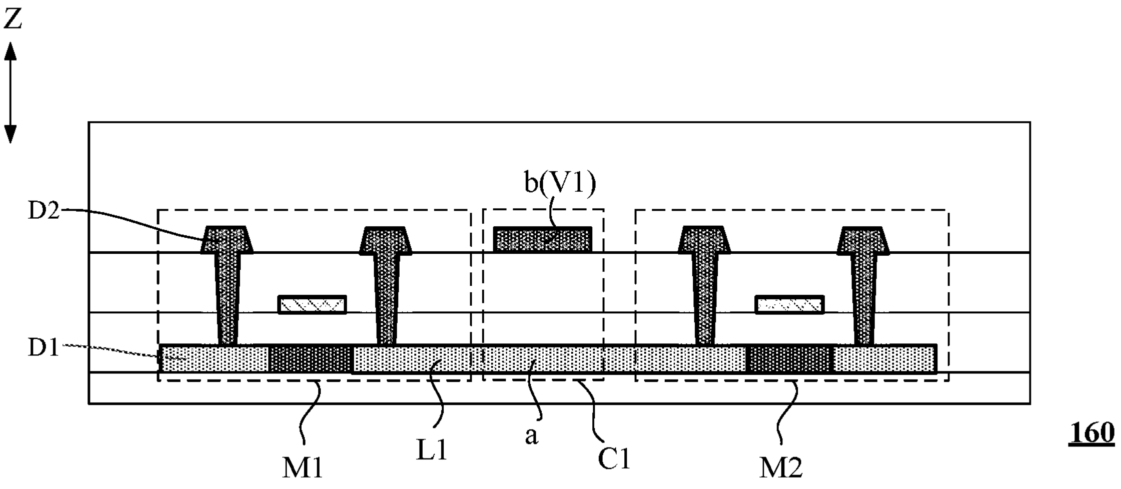
FIG. 19 is a partial cross-sectional schematic diagram of a display panel where a pixel circuit according to an embodiment of the present application is located.

FIG. 19 is a partial cross-sectional schematic diagram of a display panel where a pixel circuit according to an embodiment of the present application is located. With reference to FIG. 3 and FIG. 19, according to some embodiments of the present application, the pixel circuit 20 may be applied in the display panel 160. Optionally, the first electrode of the second transistor M2 and the second electrode of the first transistor M1 are electrically connected through a first wiring L1, the first wiring L1 may be located in a first conductive layer D1 of the display panel 160, and the constant voltage signal line V1 may be located in a second conductive layer D2 of the display panel 160. A first electrode plate a of the first storage capacitor C1 may be located in the first conductive layer D1, and the first wiring L1 may be configured as the first electrode plate a of the first storage capacitor C1. In addition/alternatively, a second electrode plate b of the first storage capacitor C1 may be located in the second conductive layer D2, and the constant voltage signal line V1 may be configured as the second electrode plate b of the first storage capacitor C1. That is, in the embodiment shown in FIG. 19, the first storage capacitor C1 may be a parasitic capacitor, thereby reducing an occupation of a wiring space by the first storage capacitor C1 and facilitating the simplification of a production process.

Figure 20:
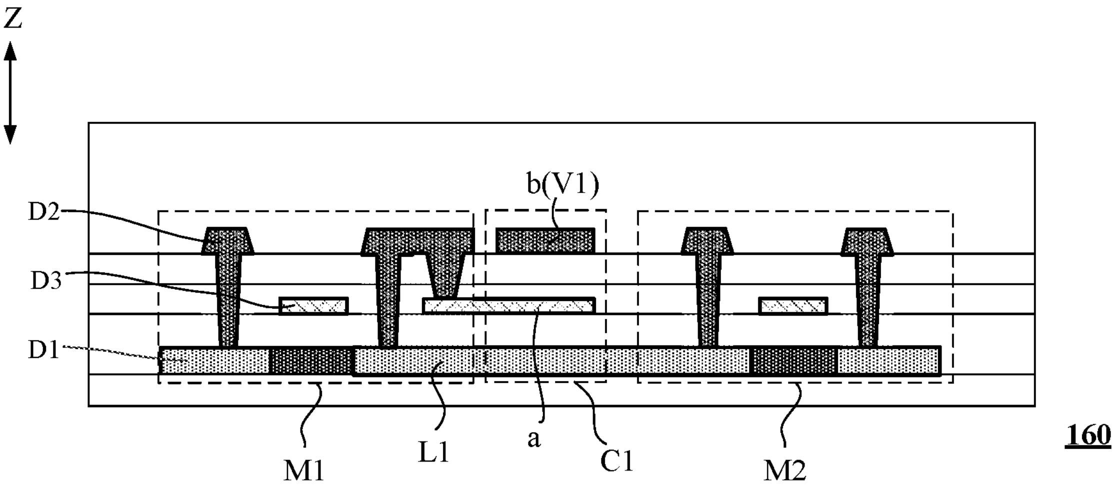
FIG. 20 is a partial cross-sectional schematic diagram of another display panel where a pixel circuit according to an embodiment of the present application is located.

FIG. 20 is a partial cross-sectional schematic diagram of another display panel where a pixel circuit according to an embodiment of the present application is located. With reference to FIG. 3 and FIG. 20, according to some other embodiments of the present application, optionally, the display panel 160 includes the first conductive layer D1, the second conductive layer D2 and a third conductive layer D3. Along a direction Z perpendicular to a plane where the display panel is located, the first electrode plate a of the first storage capacitor C1 may be located in the third conductive layer D3, and the first electrode plate a of the first storage capacitor C1 is electrically connected to the first electrode of the second transistor M2 or the second electrode of the first transistor M1. The second electrode plate b of the first storage capacitor C1 may be located in the second conductive layer D2 and electrically connected to the constant voltage signal line V1 located in the second conductive layer D2. That is, in the embodiment shown in FIG. 20, the first storage capacitor C1 may also be an additional storage capacitor, which is not limited in the embodiment of the present application.

Figure 21:
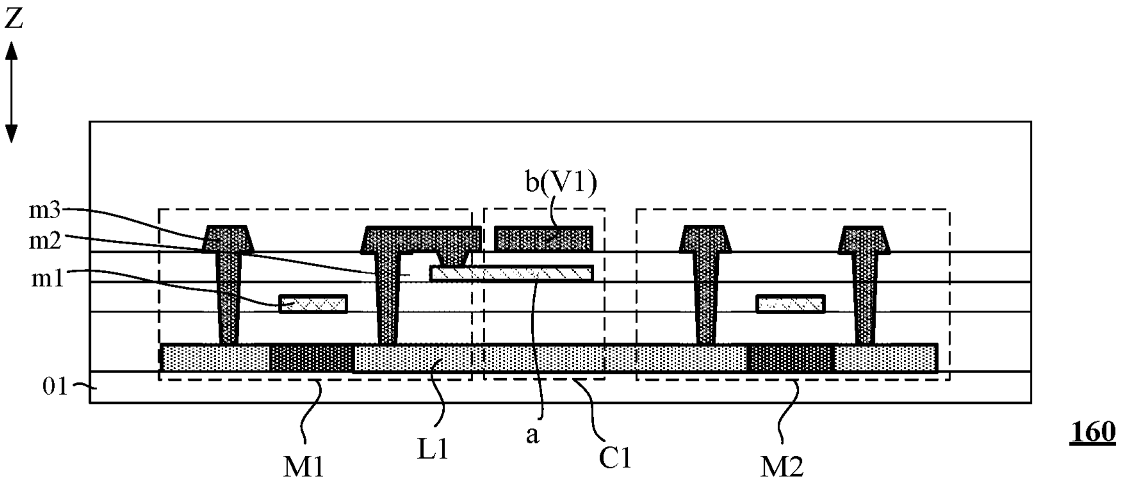
FIG. 21 is a partial cross-sectional schematic diagram of another display panel where a pixel circuit according to an embodiment of the present application is located.

FIG. 21 is a partial cross-sectional schematic diagram of another display panel where a pixel circuit according to an embodiment of the present application is located. With reference to FIG. 3 and FIG. 21, according to some embodiments of the present application, optionally, the pixel circuit 20 may be applied in the display panel 160. Along the direction Z perpendicular to the plane where the display panel is located, the display panel 160 may include a substrate 01, a first metal layer m1, a second metal layer m2 and a third metal layer m3 arranged in a stack. The driving module 201 may include the driving transistor MT, the first switch module 203 may include the first transistor M1, the second switch module 204 may include the second transistor M2, and the voltage regulator module 205 may include the first storage capacitor C1. The gate of the driving transistor MT, the gate of the first transistor M1 and the gate of the second transistor M2 may all be located in the first metal layer m1. The first electrode and second electrode of the driving transistor MT, the first electrode and second electrode of the first transistor M1 and the first electrode and second electrode of the second transistor M2 may all be located in the third metal layer m3. The first electrode plate a and the second electrode plate b of the first storage capacitor C1 are respectively located in different film layers of the first metal layer m1, the second metal layer m2 and the third metal layer m3. For example, the first electrode plate a of the first storage capacitor C1 is located in the second metal layer m2, and the second electrode plate b of the first storage capacitor C1 is located in the third metal layer m3. For another example, the first electrode plate a of the first storage capacitor C1 is located in the first metal layer m1, and the second electrode plate b of the first storage capacitor C1 is located in the third metal layer m3.

Based on the pixel circuit 20 according to the above-mentioned embodiments, correspondingly, the embodiments of the present application further provide a specific implementation of a driving method for a pixel circuit. The driving method for the pixel circuit can be applied to the pixel circuit 20 according to the above-mentioned embodiments.

Figure 22:
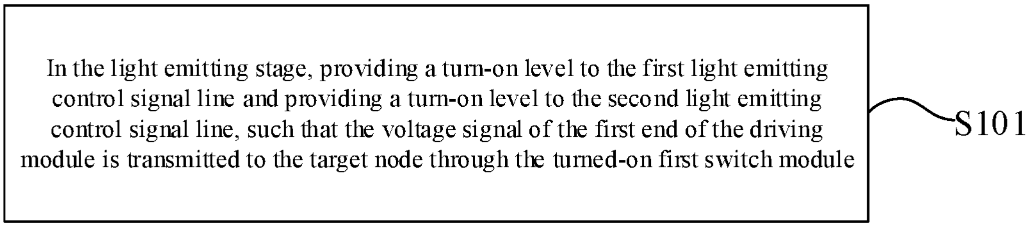
FIG. 22 is a schematic flowchart of a driving method for a pixel circuit according to an embodiment of the present application.

FIG. 22 is a schematic flowchart of a driving method for a pixel circuit according to an embodiment of the present application. As shown in FIG. 22, the driving method for the pixel circuit according to the embodiment of the present application includes the following steps:

S101. In the light emitting stage, providing a turn-on level to the first light emitting control signal line and providing a turn-on level to the second light emitting control signal line, such that a voltage signal of the first end of the driving module is transmitted to the target node through the turned-on first switch module.

It should be noted that, a specific implementation process of step S101 has been described in detail above, and for brevity of description, will not be repeated herein.

In the driving method for the pixel circuit according to the embodiment of the present application, in the light emitting stage, the first switch module is turned on in response to the turn-on level of the first light emitting control signal line, the second switch module is turned on in response to the turn-on level of the second light emitting control signal line, and the voltage signal (i.e., charge) of the third node is transmitted to the target node through the turned-on first switch module, such that the potential of the target node is the same as the potential of the first end (i.e., the third node) of the driving module. Since the voltage difference between the potential of the first end (i.e., the third node) of the driving module and the potential of the first node is small, while the potential of the target node is the same as the potential of the first end (i.e., the third node) of the driving module, the voltage difference between the potential of the target node and the potential of the first node is small. Therefore, the leakage current of the first node to the target node through the threshold compensation module can be effectively reduced, thereby effectively preventing the light emitting luminance of the light emitting element from deviating from the desired target luminance, and improving the luminance stability of the display panel; at the same time, improving or even eliminating the luminance difference of different rows of the light emitting elements, and improving the luminance uniformity of the display panel.

Figure 23:
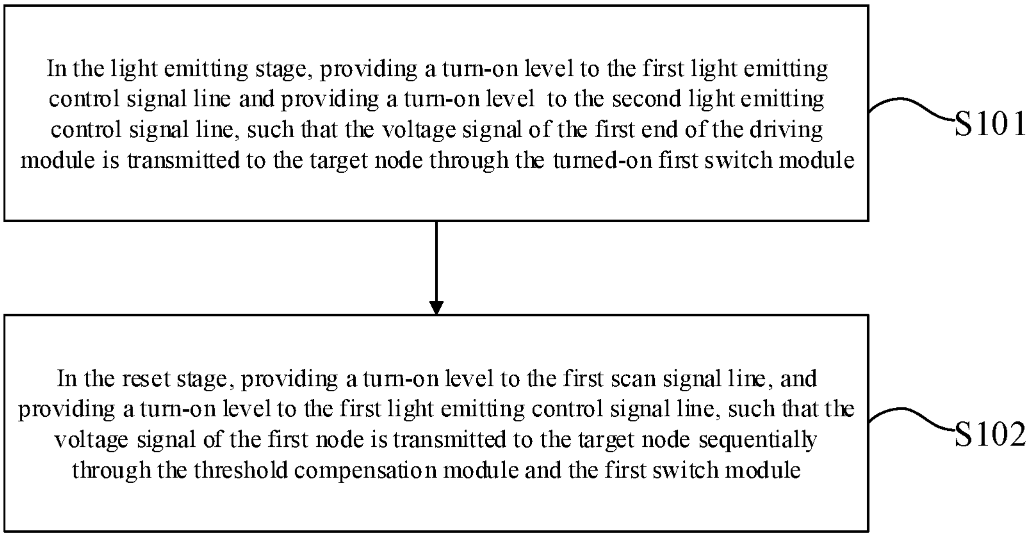
FIG. 23 is a schematic flowchart of another driving method for a pixel circuit according to an embodiment of the present application.

According to some embodiments of the present application, optionally, time of a frame includes the initialization stage, the data writing stage, the light emitting stage, and the reset stage, the reset stage of an i-th frame is located after the light emitting stage of the i-th frame and before the initialization stage of a (i+1)-th frame, wherein i is a positive integer. FIG. 23 is a schematic flowchart of another driving method for a pixel circuit according to an embodiment of the present application. As shown in FIG. 23, the driving method for the pixel circuit according to the embodiment of the present application further includes the following steps:

S102. In the reset stage, providing a turn-on level to the first scan signal line, and providing a turn-on level to the first light emitting control signal line, such that the voltage signal of the first node is transmitted to the target node sequentially through the threshold compensation module and the first switch module.

It should be noted that, a specific implementation process of step S102 has been described in detail above, and for brevity of description, will not be repeated herein.

In the reset stage, the threshold compensation module is turned on in response to the turn-on level of the first scan signal line, the first switch module is turned on in response to the turn-on level of the first light emitting control signal line, and the voltage signal (i.e., charge) of the first node is transmitted to the target node sequentially through the threshold compensation module and the first switch module. Since a potential change of the first node N1 in adjacent frames is small, the voltage difference between the potential of the first node N1 in the light emitting stage of the i-th frame and the potential of the first node N1 in the light emitting stage of the (i+1)-th frame is small. As analyzed above, in the light emitting stage, the voltage difference between the potential of the third node N3 and the potential of the first node N1 is small. Therefore, regardless of whether the potential of the target node Nm is the same as the potential of the third node N3 or the potential of the first node N1 in the light emitting stage of a previous frame, at least in the light emitting stage of the current frame, the voltage difference between the potential of the target node Nm and the potential of the first node N1 is enabled to be small. Therefore, the leakage current of the first node N1 to the target node Nm through the threshold compensation module can be effectively reduced, thereby effectively preventing the light emitting luminance of the light emitting element from deviating from the desired target luminance, and improving the luminance stability of the display panel; at the same time, improving or even eliminating the luminance difference of different rows of the light emitting elements, and improving the luminance uniformity of the display panel.

As shown in FIG. 14, according to some embodiments of the present application, optionally, the pixel circuit 20 may further include the offset compensation module 1401, the control end of the offset compensation module 1401 is electrically connected to the seventh scan signal line S7, the first end of the offset compensation module 1401 is electrically connected to the offset compensation voltage signal line V2, and the second end of the offset compensation module 1401 is electrically connected to the second end (i.e., the second node N2) of the driving module 201.

Accordingly, the light emitting stage may include a first stage and a second stage. S101. In the light emitting stage, providing a turn-on level to the first light emitting control signal line and providing a turn-on level to the second light emitting control signal line, specifically includes the following steps:

In the first stage, providing a turn-on level to the seventh scan signal line, such that the offset compensation voltage signal from the offset compensation voltage signal line is transmitted to the second end of the driving module through the turned-on offset compensation module, so as to compensate for the threshold voltage of the driving module.

In the second stage, providing a turn-on level to the first light emitting control signal line, and providing a turn-on level to the second light emitting control signal line, such that the voltage signal of the first end of the driving module is transmitted to the target node through the turned-on first switch module and second switch module.

In this way, the threshold voltage Vth of the driving module 201 is adjusted by the offset compensation voltage, such that the threshold voltage Vth of the driving module 201 is adjusted in advance before the light emitting element D is driven to emit light, so as to reduce the deviation between the actual offset amount and the desired target offset amount of the threshold voltage Vth and improve the display effect of the display panel.

Figure 24:
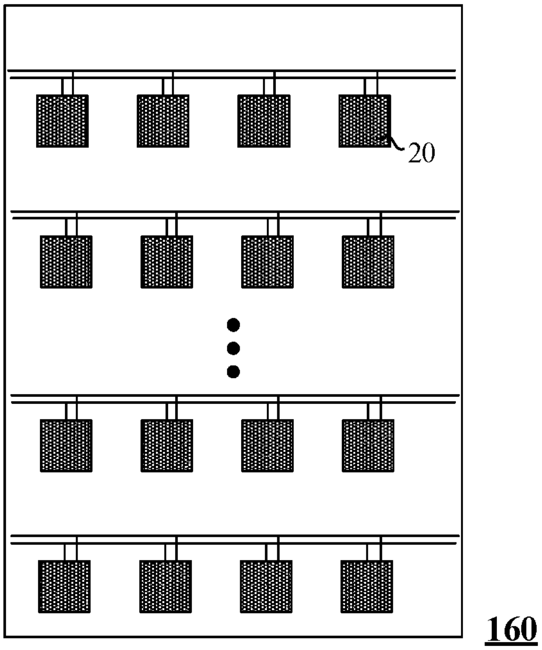
FIG. 24 is a schematic structural diagram of a display panel according to an embodiment of the present application.

Based on the pixel circuit 20 according to the above-mentioned embodiments, correspondingly, the embodiments of the present application further provide a display panel. FIG. 24 is a schematic structural diagram of a display panel according to an embodiment of the present application. As shown in FIG. 24, the display panel 160 according to the embodiment of the present application may include the pixel circuit 20 according to the above-mentioned embodiments. In some specific examples, optionally, the display panel 160 includes, but is not limited to, an OLED display panel.

As shown in FIG. 18, according to some embodiments of the present application, optionally, the display panel 160 may further include a scan drive circuit 1801, the scan drive circuit 1801 includes a plurality of cascaded shift registers 1801*a*, the plurality of cascaded shift registers 1801*a* are arranged in sequence along a first direction Y, one shift register 1801*a* may be electrically connected to adjacent N rows of the pixel circuits through scan signal lines, one row of the pixel circuits includes a plurality of pixel circuits 20 arranged in sequence along a second direction X, the first direction intersects with the second direction, N>2 and is an integer.

With reference to FIG. 2 and FIG. 16, in some specific embodiments, optionally, the display panel 160 may include the first scan drive circuit 1601, and the first scan drive circuit 1601 may output the first scan drive signal for controlling turn-on/turn-off of transistors in the pixel circuits. The first scan drive circuit 1601 may include a plurality of cascaded first shift registers 1601*a*, that is, the input end of the (j+1)-th first shift register 1601*a* is electrically connected to the output end of the j-th first shift register 1601*a*, wherein j is a positive integer. Each first shift register 1601*a* may be electrically connected to the threshold compensation modules 202 in two adjacent rows of the pixel circuits through the first scan signal lines S1, one row of the pixel circuits corresponds to one first scan signal line S1, and one row of the pixel circuits includes a plurality of pixel circuits 20.

In this way, the first scan drive signal is provided to two adjacent rows of the pixel circuits through one first shift register 1601*a*, which can reduce the number of the first shift registers 1601*a*, and is beneficial to realize a narrow border while reducing the production cost.

As shown in FIG. 8, in some specific embodiments, optionally, the pixel circuit may include the second reset module 802, the control end of the second reset module 802 is electrically connected to the fifth scan signal line S5, the first end of the second reset module 802 is electrically connected to the reference voltage signal line Vref, the second end of the second reset module 802 is electrically connected to the first node N1, and the second reset module 802 is configured to transmit the reference voltage signal from the reference voltage signal line Vref to the first node N1, so as to reset the first node N1.

With reference to FIG. 8 and FIG. 17, in some specific embodiments, optionally, the display panel 160 may further include the second scan drive circuit 1602, and the second scan drive circuit 1602 may output the second scan drive signal for controlling the turn-on/turn-off of transistors in the pixel circuits. The second scan drive circuit 1602 includes a plurality of cascaded second shift registers 1602*a*, that is, the input end of the (j+1)-th second shift register 1602*a* is electrically connected to the output end of the j-th second shift register 1602*a*, wherein j is a positive integer. Each second shift register 1602*a* may be electrically connected to the second reset modules 802 in two adjacent rows of the pixel circuits through the fifth scan signal lines S5, one row of the pixel circuits corresponds to one fifth scan signal line S5, and one row to of the pixel circuits includes a plurality of pixel circuits 20.

In this way, the second scan drive signal is provided to two adjacent rows of the pixel circuits through one second shift register 1602*a*, which can reduce the number of the second shift registers 1602*a*, and is beneficial to realize a narrow border while reducing the production cost.

With reference to FIG. 9 and FIG. 18, in some specific embodiments, optionally, if the scan signal output by the first scan signal line S1 and the scan signal output by the fifth scan signal line S5 are the same or similar (e.g., the width and period are the same or similar), the same shift register may be connected to the first scan signal line S1 and the fifth scan signal line S5 respectively. Specifically, the display panel 160 may include the scan drive circuit 1801, and the scan drive circuit 1801 includes a plurality of cascaded shift registers 1801*a*, that is, the input end of the (j+1)-th shift register 1801*a* is electrically connected to the output end of the j-th shift register 1801*a*, wherein j is a positive integer. Each shift register 1801*a* may be electrically connected to the threshold compensation modules 202 in the j-th row of the pixel circuits through the first scan signal line S1, and may be electrically connected to the second reset modules 802 in the (j+1)-th row of the pixel circuits through the fifth scan signal line S5, one row of the pixel circuits includes a plurality of pixel circuits 20, wherein j is a positive integer.

In this way, scan drive signals can be provided to two adjacent rows of the pixel circuits through one shift register 1801*a*, which can reduce the number of shift registers 1801*a*, and is beneficial to realize a narrow border while reducing the production cost.

It should be understood that, the specific structures of the pixel circuit and the display panel provided in the drawings of the embodiments of the present application are only some examples, and are not intended to limit the present application. In addition, in the case of non-contradiction, the above-mentioned embodiments provided in the present application may combine with each other.

In accordance with the embodiments of the present application as described above, these embodiments do not exhaustively describe all the details, nor do they limit the application to only the specific embodiments described. Obviously, many modifications and variations are possible in light of the above description. The detailed description of these embodiments are for a better explanation of principles and practical applications of the present application, to thereby enable those skilled in the art to best utilize the present application and various embodiments with various modifications. This application is limited only by the claims, along with their full scope and equivalents.

It should be clear that, various embodiments in the specification are described in a progressive way, and the same or similar parts of various embodiments may be referred to each other, and each embodiment focuses on the differences from other embodiments. For the embodiments of the display panel and the embodiments of the display apparatus, related parts may refer to the description parts of the embodiments of the pixel driving circuit and the embodiments of the array substrate. The present application is not limited to the specific structures described above and shown in the drawings. Various changes, modifications and additions can be made by those skilled in the art after they comprehend the spirit of the present application. And, for sake of brevity, a detailed description of the known technology is omitted herein.

Those skilled in the art should understand that the above-mentioned embodiments are all illustrative and non-restrictive. Different technical features appearing in different embodiments can be combined to achieve beneficial effects. Those skilled in the art should be able to understand and implement other modified embodiments of the disclosed embodiments on the basis of studying the drawings, the description, and the claims. In the claims, the term "comprising" does not exclude other structures, the number relates to "one" but does not exclude a plurality, the terms "first" and "second" are configured to indicate names and not to indicate any particular order. Any reference signs in the claims should not be construed as limiting the protection scope. The presence of certain technical features in different dependent claims does not mean that these technical features cannot be combined to obtain beneficial effects.

What is claimed is:

1. A pixel circuit, comprising:

a driving module, a control end of the driving module being electrically connected to a first node;

a threshold compensation module, a control end of the threshold compensation module being electrically connected to a first scan signal line, a first end of the threshold compensation module being electrically connected to the first node, and a second end of the threshold compensation module being electrically connected to a first end of the driving module;

a first switch module, a control end of the first switch module being electrically connected to a first light emitting control signal line, and a first end of the first switch module being electrically connected to the first end of the driving module;

a second switch module, a control end of the second switch module being electrically connected to a second light emitting control signal line, a first end of the second switch module being electrically connected to a second end of the first switch module, and a second end of the second switch module being electrically connected to a first electrode of a light emitting element;

a voltage regulator module, a first end of the voltage regulator module being electrically connected to a constant voltage signal line, a second end of the voltage regulator module being electrically connected to a target node, the target node being a connection node between the first end of the second switch module and the second end of the first switch module, and the voltage regulator module being configured to maintain a potential of the target node;

in a light emitting stage, the first switch module is turned on in response to a turn-on level of the first light emitting control signal line, the second switch module is turned on in response to a turn-on level of the second light emitting control signal line, and the light emitting element emits light.

2. The pixel circuit according to claim 1, wherein time of a frame comprises an initialization stage, a threshold compensation stage and a light emitting stage;

an absolute value of a difference between the potential of the target node in a first target stage and a potential of the first node in the light emitting stage is less than 4 volts, wherein the first target stage comprises the light emitting stage of the frame to the light emitting stage of a next frame.

3. The pixel circuit according to claim 1, wherein the first end of the driving module is further electrically connected to a third node;

in the light emitting stage, a voltage signal of the third node is transmitted to the target node through the first switch module.

4. The pixel circuit according to claim 3, wherein the first light emitting control signal line and the second light emitting control signal line are a same signal line.

5. The pixel circuit according to claim 1, wherein time of a frame comprises an initialization stage, a threshold compensation stage, a light emitting stage and a reset stage, the reset stage of an i-th frame is located after the light emitting stage of the i-th frame and before the initialization stage of a (i+1)-th frame, wherein i is a positive integer;

in the reset stage, the threshold compensation module is turned on in response to a turn-on level of the first scan signal line, the first switch module is turned on in response to a turn-on level of the first light emitting control signal line, and a voltage signal of the first node is transmitted to the target node sequentially through the threshold compensation module and the first switch module.

6. The pixel circuit according to claim 5, wherein the first light emitting control signal line and the second light emitting control signal line are different signal lines;

at least in the reset stage, a signal transmitted by the first light emitting control signal line is different from a signal transmitted by the second light emitting control signal line.

7. The pixel circuit according to claim 1, wherein the pixel circuit further comprises a third switch module, a control end of the third switch module is electrically connected to a second scan signal line, a first end of the third switch module is electrically connected to the second end of the threshold compensation module, and a second end of the third switch module is electrically connected to the first end of the driving module;

in the light emitting stage, the third switch module is turned off in response to a turn-off level of the second scan signal line.

8. The pixel circuit according to claim 1, wherein the pixel circuit further comprises a first reset module, a control end of the first reset module is electrically connected to a third scan signal line, a first end of the first reset module is electrically connected to a reference voltage signal line, and a second end of the first reset module is electrically connected to the second end of the voltage regulator module;

before the light emitting stage, the first reset module is turned on in response to a turn-on level of the third scan signal line, and transmits a reference voltage signal from the reference voltage signal line to the second end of the voltage regulator module, so as to reset the second end of the voltage regulator module.

9. The pixel circuit according to claim 1, wherein the first switch module comprises a first transistor, the second switch module comprises a second transistor, and the voltage regulator module comprises a first storage capacitor, wherein:

a gate of the first transistor is electrically connected to the first light emitting control signal line, and a first electrode of the first transistor is electrically connected to the first end of the driving module;

a gate of the second transistor is electrically connected to the second light emitting control signal line, a first electrode of the second transistor is electrically connected to a second electrode of the first transistor, and a second electrode of the second transistor is electrically connected to a first electrode of the light emitting element;

a first electrode plate of the first storage capacitor is electrically connected to the constant voltage signal line, and a second electrode plate of the first storage capacitor is electrically connected to the target node.

10. The pixel circuit according to claim 9, wherein the pixel circuit is applied in a display panel;

the first electrode of the second transistor and the second electrode of the first transistor are electrically connected through a first wiring, the first wiring is located in a first conductive layer of the display panel, and the constant voltage signal line is located in a second conductive layer of the display panel;

the first electrode plate of the first storage capacitor is located in the first conductive layer, and the first wiring is configured as the first electrode plate of the first storage capacitor; and/or, the second electrode plate of the first storage capacitor is located in the second conductive layer, and the constant voltage signal line is configured as the second electrode plate of the first storage capacitor.

11. The pixel circuit according to claim 1, wherein the pixel circuit further comprises:

a data writing module, a control end of the data writing module being electrically connected to a fourth scan signal line, a first end of the data writing module being electrically connected to a data voltage signal line, a second end of the data writing module being electrically connected to a second end of the driving module, and the data writing module being configured to transmit a data voltage signal from the data voltage signal line to the second end of the driving module;

a second reset module, a control end of the second reset module being electrically connected to a fifth scan signal line, a first end of the second reset module being electrically connected to a reference voltage signal line, a second end of the second reset module being electrically connected to the first node, and the second reset module being configured to transmit a reference voltage signal from the reference voltage signal line to the first node, so as to reset the first node;

a third reset module, a control end of the third reset module being electrically connected to a sixth scan signal line, a first end of the third reset module being electrically connected to the reference voltage signal line, and a second end of the third reset module being electrically connected to a first electrode of the light emitting element, and the third reset module being configured to transmit the reference voltage signal from the reference voltage signal line to the first electrode of the light emitting element, so as to reset the first electrode of the light emitting element;

a light emitting control module, a control end of the light emitting control module being electrically connected to the second light emitting control signal line, a first end of the light emitting control module being electrically connected to a first power supply voltage signal line, and a second end of the light emitting control module being electrically connected to the second end of the driving module;

a second storage capacitor, a first electrode plate of the second storage capacitor being electrically connected to the first power supply voltage signal line, and a second electrode plate of the second storage capacitor being electrically connected to the first node.

12. The pixel circuit according to claim 11, wherein at least one of the threshold compensation module and the second reset module comprises an N-type transistor, and at least one of the driving module, the data writing module and the light emitting control module comprises a P-type transistor.

13. The pixel circuit according to claim 1, wherein the pixel circuit is applied in the display panel, the display panel comprises a first scan drive circuit, the first scan drive circuit comprises a plurality of cascaded first shift registers, one of the first shift registers is electrically connected to the threshold compensation modules in two adjacent rows of pixel circuits through the first scan signal lines, wherein one row of the pixel circuits corresponds to one of the first scan signal lines, and one row of the pixel circuits comprises a plurality of the pixel circuits.

14. The pixel circuit according to claim 11, wherein the pixel circuit is applied in the display panel, the display panel comprises a second scan drive circuit, the second scan drive circuit comprises a plurality of cascaded second shift registers, one of the second shift registers is electrically connected to the second reset modules in two adjacent rows of the pixel circuits through the fifth scan signal lines, wherein one row of the pixel circuits corresponds to one of the fifth scan signal lines, and one row of the pixel circuits comprises a plurality of the pixel circuits.

15. The pixel circuit according to claim 11, wherein the pixel circuit is applied in the display panel, the display panel comprises a scan drive circuit, the scan drive circuit comprises a plurality of cascaded shift registers, one of the shift registers is electrically connected to the threshold compensation modules in a j-th row of the pixel circuits through the first scan signal line, and is electrically connected to the second reset modules in a (j+1)-th row of the pixel circuits through the fifth scan signal line, wherein one row of the pixel circuits comprises a plurality of the pixel circuits, and j is a positive integer.

16. The pixel circuit according to claim 11, wherein the data writing module comprises a third transistor, a gate of the third transistor is electrically connected to the fourth scan signal line, a first electrode of the third transistor is electrically connected to the data voltage signal line, and a second electrode of the third transistor is electrically connected to the second end of the driving module;

the second reset module comprises a fourth transistor, a gate of the fourth transistor is electrically connected to the fifth scan signal line, a first electrode of the fourth transistor is electrically connected to the reference voltage signal line, and a second electrode of the fourth transistor is electrically connected to the first electrode of the light emitting element;

the third reset module comprises a fifth transistor, a gate of the fifth transistor is electrically connected to the sixth scan signal line, a first electrode of the fifth transistor is electrically connected to the reference voltage signal line, and a second electrode of the fifth transistor is electrically connected to the first electrode of the light emitting element;

the light emitting control module comprises a sixth transistor, a gate of the sixth transistor is electrically connected to the second light emitting control signal line, a first electrode of the sixth transistor is electrically connected to the first power supply voltage signal line, and a second electrode of the sixth transistor is electrically connected to the second end of the driving module.

17. The pixel circuit according to claim 16, wherein the sixth transistor comprises a first sub-transistor and a second sub-transistor disposed in series, a gate of the first sub-transistor and a gate of the second sub-transistor are both electrically connected to the second light emitting control signal line, a first electrode of the first sub-transistor is electrically connected to the first power supply voltage signal line, a second electrode of the first sub-transistor is electrically connected to a first electrode of the second sub-transistor, and a second electrode of the second sub-transistor is electrically connected to the second end of the driving module.

18. The pixel circuit according to claim 1, wherein the pixel circuit further comprises an offset compensation module, a control end of the offset compensation module is electrically connected to a seventh scan signal line, a first end of the offset compensation module is electrically connected to an offset compensation voltage signal line, and a second end of the offset compensation module is electrically connected to the second end of the driving module;

the light emitting stage comprises a first stage and a second stage, wherein in the first stage, the offset compensation module is turned on in response to a turn-on level of the seventh scan signal line, and transmits an offset compensation voltage signal from the offset compensation voltage signal line to the second end of the driving module, so as to compensate for a threshold voltage of the driving module;

in the second stage, the first switch module is turned on in response to a turn-on level of the first light emitting control signal line, the second switch module is turned on in response to a turn-on level of the second light emitting control signal line, and the light emitting element emits light.

19. A driving method for a pixel circuit, wherein the pixel circuit comprises the pixel circuit according to claim 1, and the driving method comprises:

in the light emitting stage, providing a turn-on level to the first light emitting control signal line, and providing a turn-on level to the second light emitting control signal line, such that a voltage signal of the first end of the driving module is transmitted to the target node through the turned-on first switch module.

20. A display panel, comprising the pixel circuit according to claim 1.

* * * * *